United States Patent
Chi et al.

(10) Patent No.: US 8,783,030 B2
(45) Date of Patent: Jul. 22, 2014

(54) SYSTEM FOR CONTROLLING AN AIR HANDLING SYSTEM INCLUDING AN ELECTRIC PUMP-ASSISTED TURBOCHARGER COMPRESSOR

(75) Inventors: John N Chi, Columbus, IN (US); John M Mulloy, Columbus, IN (US); Sriram S Popuri, Greenwood, IN (US); Timothy R Frazier, Columbus, IN (US); Martin T Books, Columbus, IN (US); Divakar Rajamohan, Columbus, IN (US); Indranil Brahma, Bloomington, IN (US)

(73) Assignee: Cummins Inc., Columbus, IN (US)

( * ) Notice: Subject to any disclaimer, the term of this patent is extended or adjusted under 35 U.S.C. 154(b) by 354 days.

(21) Appl. No.: 13/244,552

(22) Filed: Sep. 25, 2011

(65) Prior Publication Data

US 2013/0074496 A1     Mar. 28, 2013

(51) Int. Cl.
| F02B 33/44 | (2006.01) |
| F02D 23/00 | (2006.01) |
| F02M 25/07 | (2006.01) |
| F02B 37/04 | (2006.01) |
| F02B 37/16 | (2006.01) |
| F02B 37/18 | (2006.01) |
| F02B 37/24 | (2006.01) |
| F02D 41/00 | (2006.01) |

(52) U.S. Cl.
CPC .............. *F02B 33/44* (2013.01); *F02B 37/04* (2013.01); *F02B 37/16* (2013.01); *F02B 37/18* (2013.01); *F02B 37/24* (2013.01); *F02D 23/00* (2013.01); *F02D 41/0007* (2013.01); *F02D 41/0065* (2013.01)
USPC ............ 60/608; 60/611; 60/605.1; 60/605.2; 60/602; 123/568.12; 123/568.22; 701/104; 701/108

(58) Field of Classification Search
CPC .......... F02B 33/44; F02B 37/04; F02B 37/16; F02B 37/24; F02B 39/10; F02D 23/00; F02D 41/0007; F02D 41/0065; F02D 2041/1433; F02D 2200/101; F02M 25/0707; F02M 25/0713; F02M 25/0727; F02M 25/0754; Y02T 10/144; Y02T 10/47
USPC ................ 60/607–609, 602, 605.2, 612, 611, 60/605.1; 123/568.12, 568.22; 701/104, 701/108
IPC .................................. F02B 33/44; F02M 25/07
See application file for complete search history.

(56) References Cited

U.S. PATENT DOCUMENTS

| 6,029,452 | A  | * | 2/2000 | Halimi et al.   | 60/608 |
| 6,739,135 | B2 | * | 5/2004 | Criddle et al.  | 60/608 |
| 6,883,324 | B2 | * | 4/2005 | Igarashi et al. | 60/608 |
| 6,889,503 | B2 | * | 5/2005 | Hoecker et al.  | 60/608 |

(Continued)

*Primary Examiner* — Thai Ba Trieu
(74) *Attorney, Agent, or Firm* — Faegre Baker Daniels LLP

(57) ABSTRACT

A system and method are provided for controlling an air handling system for an internal combustion engine including a turbocharger having a variable geometry turbine and a compressor having a fresh air inlet fluidly coupled to ambient and to an air outlet of an electric air pump. An air pump enable value as determined a function of target engine speed and total fuel target values and an air flow target is determined as a function of a target fresh air flow value. Operation of the electric air pump is activated to supply supplemental air flow to the fresh air inlet of the compressor if the air pump enable value is greater than a threshold air pump enable value and the air flow target does not exceed a maximum flow value.

18 Claims, 11 Drawing Sheets

(56) References Cited

U.S. PATENT DOCUMENTS

| | | | |
|---|---|---|---|
| 6,907,867 B2* | 6/2005 | Igarashi et al. | 60/608 |
| 6,922,996 B2* | 8/2005 | Ellmer et al. | 60/608 |
| 7,530,229 B2* | 5/2009 | Akita | 60/608 |
| 2007/0180824 A1* | 8/2007 | Yamagata | 60/602 |
| 2008/0011278 A1* | 1/2008 | Yamagata | 60/609 |
| 2010/0115944 A1* | 5/2010 | Shutty et al. | 60/607 |

* cited by examiner

SYSTEM FOR CONTROLLING AN AIR HANDLING SYSTEM INCLUDING AN ELECTRIC PUMP-ASSISTED TURBOCHARGER COMPRESSOR

FIELD OF THE INVENTION

The present invention relates generally to air handling systems for internal combustion engines, and more specifically to systems for controlling such air handling systems including an electric pump-assisted turbocharger compressor.

BACKGROUND

It is desirable to control an air handling system of an internal combustion engine, particularly during transient events, to provide for a responsive air handling system capable of responding appropriately to transient operating conditions.

SUMMARY

The present invention may comprise one or more of the features recited in the attached claims, and/or one or more of the following features and combinations thereof. An air handling system for an internal combustion engine may comprise a turbocharger having a variable geometry turbine fluidly coupled to an exhaust manifold of the engine and a compressor having a compressor outlet fluidly coupled to an intake manifold of the engine, the variable geometry turbine rotatably connected to the compressor via a rotatable shaft such that the variable geometry turbine rotatably drives the compressor via the rotatable shaft in response to exhaust gas passing through the variable geometry turbine, an electric air pump configured to selectively supply supplemental air flow to a fresh air inlet of the compressor when enabled for operation, and a control circuit including a memory having instructions stored therein that are executable by the control circuit to determine an air pump enable value as a function of at least one of a target engine speed and a total fueling target, to determine an air flow target as a function of a target fresh air flow value, and to activate the electric air pump to supply supplemental air flow to the fresh air inlet of the compressor if the air pump enable value is greater than a threshold air pump enable value and the air flow target does not exceed a maximum flow value.

The system may further comprise a first fluid passageway fluidly coupled between the fresh air inlet of the compressor and ambient, a first air intake valve disposed in-line with the first fluid passageway, a second fluid passageway fluidly coupled between an air inlet of the electric air pump and the first fluid passageway between the first intake valve and ambient, a second air intake valve disposed in-line with the second fluid passageway, a third fluid passageway fluidly coupled between an air outlet of the electric air pump and the first fluid passageway between the first intake valve and the fresh air inlet of the compressor, and a third air intake valve disposed in-line with the third fluid passageway. The instructions stored in the memory may further include instructions executable by the processor to close the first air intake valve and open the second and third air intake valves when operation of the electric air pump is activated.

Alternatively or additionally, the instructions stored in the memory may further include instructions that are executable by the control circuit to disable operation of the electric air pump from supplying supplemental air flow to the fresh air inlet of the compressor if at least one of the air pump enable value does not exceed the threshold air pump enable value and the air flow target exceeds the maximum flow value. The system may further comprise a first fluid passageway fluidly coupled between the fresh air inlet of the compressor and ambient, a first air intake valve disposed in-line with the first fluid passageway, a second fluid passageway fluidly coupled between an air inlet of the electric air pump and the first fluid passageway between the first intake valve and ambient, a second air intake valve disposed in-line with the second fluid passageway, a third fluid passageway fluidly coupled between an air outlet of the electric air pump and the first fluid passageway between the first intake valve and the fresh air inlet of the compressor, and a third air intake valve disposed in-line with the third fluid passageway. The instructions stored in the memory may further include instructions executable by the processor to open the first air intake valve and close the second and third air intake valves when operation of the electric air pump is disabled to direct fresh air from ambient into the first fluid passageway, through the first air intake valve and to the fresh air inlet of the compressor.

Alternatively or additionally, the instructions stored in the memory may further include instructions that are executable by the control circuit to determine a target turbine speed and a target compressor torque as a function of a target compressor flow rate, a target compressor outlet pressure, a compressor inlet pressure and a compressor inlet temperature, to determine a target rack setting of the variable geometry turbine as a function of the target turbine speed, the target compressor torque, a target exhaust manifold temperature and a target exhaust manifold pressure, and to control a rack setting of the variable geometry turbine as a function of the target rack setting. The instructions stored in the memory may further include instructions that are executable by the control circuit to determine when operation of the air pump is activated an air pump outlet pressure corresponding to a pressure of air supplied by the air pump and an air pump outlet temperature corresponding to a temperature of air supplied by the air pump, and to determine the target turbine speed and the target compressor torque using the air pump outlet temperature as the compressor inlet temperature and using the air pump outlet pressure as the compressor inlet pressure when the operation of the air pump is activated and the air pump is operating. The system may further comprise means for determining ambient temperature, and means for determining ambient pressure. The instructions stored in the memory may further include instructions that are executable by the control circuit to determine the air pump outlet pressure and the air pump outlet temperature each as a function of ambient pressure, the air flow target, and ambient temperature. Alternatively or additionally, the system may further comprise means for determining ambient temperature, and means for determining ambient pressure, and the instructions stored in the memory may further include instructions that are executable by the control circuit to determine the target turbine speed and the target compressor torque using the ambient pressure as the compressor inlet pressure and the ambient temperature as the compressor inlet temperature if operation of the electric air pump is otherwise disabled and non-operational.

Alternatively or additionally, the instructions stored in the memory may further include instructions that are executable by the control circuit to conduct an engine and fueling operation check and activate the electric air pump if the air pump enable value is greater than a threshold air pump enable value, the air flow target does not exceed a maximum flow value and if the engine and fueling check passes.

Alternatively or additionally, the air handling system may further include an exhaust gas recirculation (EGR) fluid passageway fluidly coupled between the exhaust manifold and the intake manifold, and the instructions stored in the memory may further include instructions that are executable by the control circuit to determine the target exhaust manifold temperature and the target exhaust manifold pressure based on target charge parameters, target engine fueling parameters and a target flow rate of exhaust gas in the EGR fluid passageway.

A method is provided for controlling an air handling system for an internal combustion engine including a turbocharger having a variable geometry turbine fluidly coupled to an exhaust manifold of the engine and a compressor having a compressor outlet fluidly coupled to an intake manifold of the engine, and an electric air pump fluidly coupled to a fresh air inlet of the compressor. The method may comprise determining an air pump enable value as a function of target engine speed and total fuel target values, determining an air flow target as a function of a target fresh air flow value, and activating operation of the electric air pump to supply supplemental air flow to the fresh air inlet of the compressor if the air pump enable value is greater than a threshold air pump enable value and the air flow target does not exceed a maximum flow value.

The air handling system may further comprise a first fluid passageway fluidly coupled between the fresh air inlet of the compressor and ambient, a first air intake valve disposed in-line with the first fluid passageway, a second fluid passageway fluidly coupled between an air inlet of the electric air pump and the first fluid passageway between the first intake valve and ambient, a second air intake valve disposed in-line with the second fluid passageway, a third fluid passageway fluidly coupled between an air outlet of the electric air pump and the first fluid passageway between the first intake valve and the fresh air inlet of the compressor, and a third air intake valve disposed in-line with the third fluid passageway, and the method may further comprise closing the first air intake valve, opening the second air intake valve, and opening third air intake valves when operation of the electric air pump is activated.

Alternatively or additionally, the method may further comprise disabling operation of the electric air pump from supplying supplemental air flow to the fresh air inlet of the compressor if at least one of the air pump enable value does not exceed the threshold air pump enable value and the air flow target exceeds the maximum flow value. The air handling system may further comprise a first fluid passageway fluidly coupled between the fresh air inlet of the compressor and ambient, a first air intake valve disposed in-line with the first fluid passageway, a second fluid passageway fluidly coupled between an air inlet of the electric air pump and the first fluid passageway between the first intake valve and ambient, a second air intake valve disposed in-line with the second fluid passageway, a third fluid passageway fluidly coupled between an air outlet of the electric air pump and the first fluid passageway between the first intake valve and the fresh air inlet of the compressor, and a third air intake valve disposed in-line with the third fluid passageway, and the method may further comprise opening the first air intake valve and closing the second and third air intake valves when operation of the electric air pump is disabled.

Alternatively or additionally, the method may further comprise determining a target turbine speed and a target compressor torque as a function of a target compressor flow rate, a target compressor outlet pressure, a compressor inlet pressure and a compressor inlet temperature, determining a target rack setting of the variable geometry turbine as a function of the target turbine speed, the target compressor torque, a target exhaust manifold temperature and a target exhaust manifold pressure, and controlling a rack setting of the variable geometry turbine as a function of the target rack setting. The method may further comprise determining an air pump outlet pressure corresponding to a pressure of air supplied by the air pump, and determining an air pump outlet temperature corresponding to a temperature of air supplied by the air pump, and determining the target turbine speed and the target compressor torque comprises determining the target turbine speed and the target compressor torque using the air pump outlet temperature as the compressor inlet temperature and using the air pump outlet pressure as the compressor inlet pressure when the operation of the air pump is enabled and the air pump is operating. The method may further comprise determining ambient temperature, and determining ambient pressure, and determining the air pump outlet pressure may comprise determining the air pump outlet pressure as a function of the ambient temperature, the ambient pressure and the air flow target, and determining the air pump outlet temperature comprises determining the air pump outlet temperature as a function of the ambient temperature, the ambient pressure and the air flow target. Alternatively or additionally, the method may further comprise determining ambient temperature, and determining ambient pressure, and determining the target turbine speed and the target compressor torque may comprise determining the target turbine speed and the target compressor torque using the ambient pressure as the compressor inlet pressure and the ambient temperature as the compressor inlet temperature if operation of the electric air pump is otherwise disabled and non-operational.

Alternatively or additionally, the method may further comprise conducting an engine and fueling operation check, and activating operation of the electric air pump may comprise activating operation of the electric air pump if the air pump enable value is greater than a threshold air pump enable value, the air flow target does not exceed a maximum flow value and the engine and fueling operation check passes. The air handling system may further include an exhaust gas recirculation (EGR) fluid passageway fluidly coupled between the exhaust manifold and the intake manifold, and the method may further comprise determining the target exhaust manifold temperature and the target exhaust manifold pressure based on target charge parameters, target engine fueling parameters and a target flow rate of exhaust gas in the EGR fluid passageway.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same.

Figure 1:
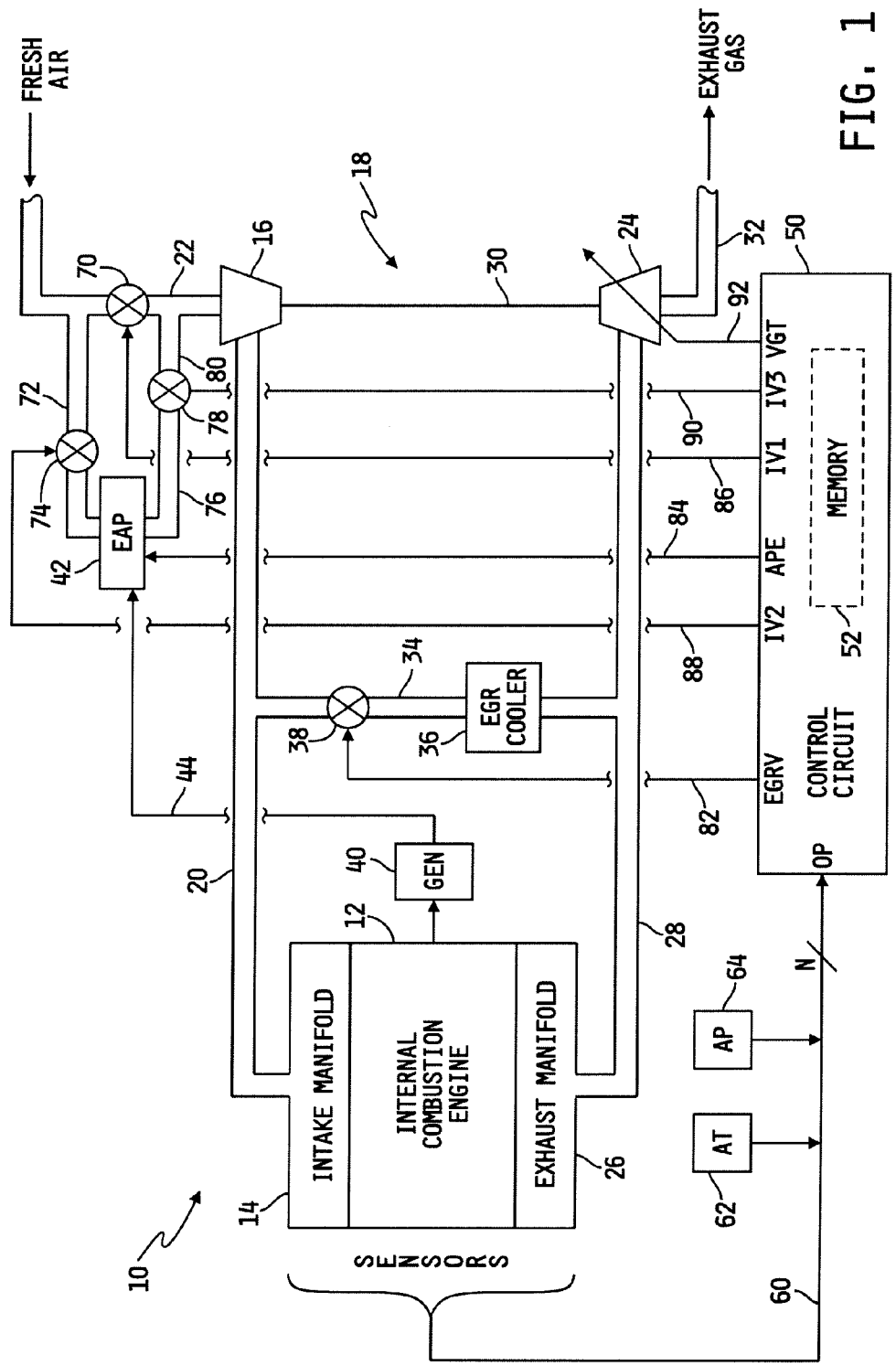
FIG. 1 is a block diagram of one illustrative embodiment of an air handling system for an internal combustion engine that includes an electric pre-compressor air pump-assisted variable geometry turbocharger.

Referring now to FIG. 1, a block diagram is shown of one illustrative embodiment of an air handling system 10 for an internal combustion engine 12 including an electric pre-compressor air pump-assisted variable geometry turbocharger 18. In the illustrated embodiment, the internal combustion engine 12 has an intake manifold 14 fluidly coupled to an outlet of a compressor 16 of a variable geometry turbocharger 18 via a fluid passageway 20. An inlet of the compressor 16 is fluidly coupled to ambient via a fluid passageway 22 such that the compressor 16 receives fresh air at its inlet via the fluid passageway 22 and supplies the fresh air, or so-called charge air, from its outlet to the intake manifold 14 via the fluid passageway 20. The compressor 16 is illustratively of a conventional design. Optionally, a charge air cooler may be disposed in-line with the fluid passageway 20, as is known in the art, to cool the charge air supplied by the compressor 16 to the intake manifold 14 in a conventional manner.

A turbine 24 of the turbocharger 18 has a fluid inlet fluidly coupled to an exhaust manifold 26 of the engine 12 via a fluid passageway 28, and a fluid outlet fluidly coupled to ambient via a fluid passageway 32. The turbine 24 is illustratively a conventional variable geometry turbocharger having a variable swallowing capacity that may be selectively controlled as indicated by the diagonal arrow passing through the turbine 24 in FIG. 1. In any case, exhaust gas produced by the engine 12 passes through the exhaust gas passageway 28 to the inlet of the turbine 24, and then passes through the outlet of the turbine 24 to ambient via the exhaust gas passageway 32 in a conventional manner.

The compressor 16 of the variable geometry turbocharger 18 includes a compressor wheel or disk (not shown) and the turbine 24 likewise includes a wheel or disk (not shown), and the wheel or disk of the compressor 16 is rotatably coupled to the wheel or disk of the turbine 24 via a rotatable shaft 30. Exhaust gas flowing through the turbine 24 causes the wheel or disk of the turbine 24 to rotate, thereby causing the shaft 30, and thus the wheel or disk of the compressor 16, to also rotate. Rotation of the wheel or disk of the compressor 16 draws additional air into the intake air passageway 20, thereby increases the flow rate of air to the intake manifold 14 above what it would otherwise be without the turbocharger 18, and in this conventional manner the turbocharger 18 supplies so-called boost air to the engine 12.

The air handling system 10 further includes an exhaust gas recirculation (EGR) fluid passageway 34 fluidly coupled between the exhaust gas passageway 28 and the intake air passageway 20. An EGR cooler 36 may be disposed in-line with the EGR passageway 34 for the purpose of cooling exhaust gas flowing through the EGR passageway 34, and an EGR control valve 38 is disposed in-line with the EGR passageway 34 between the EGR cooler 36 and the intake air passageway 20. The EGR control valve 38 is illustratively a conventional valve that can be electrically controlled in a conventional manner to selectively control the flow rate of exhaust gas passing from the exhaust gas passageway 28 to the intake manifold 14 via the intake air passageway 20. Intake fluid supplied to the intake manifold 14 of the engine 12 by the air handling system 10 is typically referred to as a "charge" and is understood to include fresh air, or air charge, supplied through the compressor 16 of the turbocharger 18 to the air intake passageway 20 and under some operating conditions of the engine 12 recirculated exhaust gas supplied through the EGR passageway 34 to the air intake passageway 20.

In the embodiment illustrated in FIG. 1, the air handling system 10 further includes an electric air pump (EAP) 42 mounted to or integral with a fluid passageway 76 that is fluidly coupled at one end to an electronically controllable valve 74 and at its opposite end to another electronically controllable valve 78. The valve 74 is further fluidly coupled to the intake fluid passageway 20 via a fluid passageway 72, and the valve 78 is fluidly coupled to the intake fluid passageway via a fluid passageway 80, and yet another electronically controllable valve 70 is disposed in-line with the intake fluid passageway 20 between the junctions of the intake fluid passageway 20 with the fluid passageways 72 and 80. The electric air pump 42 is electrically connected to a generator 40 via at least one electrical signal path 44. The generator 40 is mechanically driven by the engine 12, e.g., by the crankshaft (not shown) of the engine 12, and is operable in a conventional manner to convert rotation of the crankshaft of the engine 12 to electrical energy, and to supply such electrical energy to the electric air pump 42. The valves 74 and 78 are normally closed and the valve 70 is normally open such that fresh air is supplied via the intake conduit 22 to the inlet of the compressor 16 in a conventional manner. The electric air pump 42 is operable, when enabled, to be responsive to the electrical energy supplied by the generator 40 to pump air through the fluid passageway 76. The valves 74 and 78 are, under such operating conditions, opened and the valve 70 closed such that when the electric air pump is operable additional air is pumped by the electric air pump 42 from the fresh air inlet of the intake passageway 22, through the fluid passageway 72, the valve 74, the fluid passageway 76, the valve 78 and the fluid passageway 80 to the inlet of the compressor 16 for the purpose of selectively increasing the flow rate of air supplied by the compressor 16 to the intake manifold 14. Because the flow rate of air passing through the compressor 16 is otherwise directly proportional to the rotational speed of the wheel or disk of the compressor 16, one purpose of the electric air pump 42 is to provide the turbocharger 18 with the ability to build boost pressure very quickly within the intake air conduit 20 as a result of the increased air flow into the compressor 16 and thus provide for the ability to very quickly increase the flow rate of fresh air to the engine 12 such as during transient operating conditions of the engine 12 and air handling system 10.

In the illustrated embodiment, the air handling system 10 further includes a control circuit 50 including a memory 52 having instructions stored therein that are executable by the control circuit 50 to control operation of at least the air handling system 10, and in some embodiments the control circuit 50 is operable to also control overall operation of the engine 12. The control circuit 50 illustratively includes a conventional processor, e.g., a microprocessor, which may be programmed as illustrated and described herein to control operation of the air handling system 10 as also described herein. The control circuit 50 has a number, N, of inputs OP for receiving signals from N corresponding conventional sensors associated with the air handling system 10 and also with the engine 12 via N corresponding signal paths 60, where N may be any positive integer. The memory 52 further includes conventional instructions stored therein that are executable by the control circuit 50 to process the sensor signals produced by the N sensors to determine corresponding air handling system and/or engine operating parameters. Examples of such sensors that may be included with the air handling system 10/engine 12 and their associated operating parameters include, but are not limited to, any one or combination of a compressor inlet temperature sensor configured to produce a signal corresponding to the temperature of fresh air entering the inlet of the compressor 16, a compressor inlet pressure sensor configured to produce a signal corresponding to the pressure of air entering the inlet of the compressor 16, a compressor inlet flow rate sensor configured to produce a signal corresponding to the flow rate of fresh air entering the inlet of the compressor 16, a boost pressure sensor configured to produce a signal corresponding to charge pressure within the air intake passageway 20 and intake manifold 14, a flow rate sensor configured to produce a signal corresponding to the flow rate of fresh air supplied by the compressor 16 to the intake manifold 14 and flowing through the intake air passageway 20, an intake manifold temperature sensor configured to produce a signal corresponding to the temperature of the charge entering the engine 12 via the intake manifold 14, a speed sensor configured to produce a signal corresponding to rotational speed of the turbocharger shaft 30, a speed sensor configured to produce a signal corresponding to rotational speed of the engine 12, a differential pressure sensor configured to produce a signal corresponding to the pressure differential across the EGR valve 38 or other flow restriction disposed in-line with the EGR fluid passageway 34, a temperature sensor configured to produce a temperature signal corresponding to the temperature of recirculated exhaust gas flowing through the EGR fluid passageway 34 and/or exiting the EGR cooler 36, a pressure sensor configured to produce a signal corresponding to the pressure of exhaust gas exiting the EGR cooler 36, a flow rate sensor configured to produce a signal corresponding to the flow rate of recirculated exhaust gas flowing through the EGR passageway 34, a pressure sensor configured to produce a signal corresponding to exhaust gas pressure at the outlet of the turbine 24, an exhaust gas temperature sensor configured to produce a signal corresponding to the temperature of exhaust gas produced by the engine 12, a temperature sensor configured to produce a signal corresponding to the operating temperature of the engine 12, e.g., the temperature of engine coolant fluid circulating through the engine 12, and the like. Although such one or combination of such sensors is/are not specifically illustrated in the drawings, those skilled in the art will recognize that such one or more sensors are conventional and that various combinations of such sensors will typically be included in conventional engine and/or air handling control systems and therefore need not be specifically shown in the drawings. In the illustrated embodiment, the air handling system 10 further includes two additional sensors; a conventional ambient temperature sensor (AT) 62, and a conventional ambient pressure sensor (AP) 64. The ambient temperature sensor 62 is operable in a conventional manner to sense ambient air temperature and produce a signal on one of the signal paths 60 corresponding to ambient air temperature. Likewise, the ambient pressure sensor 64 is operable in a conventional manner to sense ambient air pressure and produce a signal on one of the signal paths 60 corresponding to ambient air pressure.

In the embodiment illustrated in FIG. 1, the control circuit 50 further includes a number of outputs electrically connected to various actuators associated with the air handling system 10. For example, the control circuit 50 includes an EGR valve output, EGRV, which is electrically connected to an actuator of the EGR valve 38 via a signal path 82. The memory 52 has instructions stored therein that are executable by the control circuit 50 to control the position of the EGR valve 38 relative to a reference position, e.g., relative to a fully open or fully closed position, by controlling the actuator of the EGR valve 38 via selective control of the actuator signal, i.e., EGR valve control signal, produced on the signal path 82 to thereby control the flow rate of recirculated exhaust gas through the EGR fluid passageway 34 in a conventional manner. The control circuit 50 further includes an electric air pump enable output, APE, which is electrically connected to an enable input of the electric air pump 42 via a signal path 84. The memory 52 has instructions stored therein that are executable by the control circuit 50 to selectively produce an enable signal on the signal path 84 to thereby selectively enable operation of the electric air pump 42 to rapidly increase the flow rate of intake air to the fluid inlet of the compressor 16, so that boost pressure supplied by the compressor 16 is accordingly rapidly increased, as will be described in greater detail hereinafter. The control circuit 50 further includes a number of inlet valve control outputs, IV1, IV2 and IV3, which are electrically connected to conventional valve actuators associated with the electronically controllable valves 70, 74 and 78 respectively. The memory 52 has instructions stored therein that are executable by the control circuit 50 to control the positions of the valves 70, 74 and 78 between fully open or fully closed position, by controlling the actuators of the valves 70, 74 and 78 via selective control of the actuator signals produced on the signal paths 86, 88 and 90 respectively to thereby control the flow path of fresh air supplied to the fluid inlet of the compressor 16. When the valve 70 is open and the valves 74 and 78 are closed, for example, fresh air flows through the intake passageway 22 through the valve 70 directly to the fluid inlet of the compressor 16. When the valve 70 is closed and the valves 74 and 78 are open, fresh air is supplied via the valve 74 to the fluid inlet of the electric air pump 42, and the electric air pump supplies fresh air with an increased flow rate to the fluid inlet of the compressor 16 via the valve 78. The control circuit 50 further includes a variable geometry turbocharger output, VGT, which is electrically connected to a conventional variable geometry actuator of the turbocharger turbine 24 via a signal path 92. The memory 52 has instructions stored therein that are executable by the control circuit 50 to selectively control the geometry of the turbine 24, i.e., the exhaust gas swallowing capacity of the turbine 24, in a conventional manner by controlling the variable geometry actuator of the turbocharger turbine 24 via selective control of a VGT control signal produced on the signal path 92.

The air handling system 10 may, in some embodiments, illustratively include one or more additional actuators. For example, in some embodiments the air handling system 10 may include an intake assist throttle positioned in-line with the air intake conduit 20 for the purpose of modulating fresh air flow through the engine system as described hereinabove. In some embodiments the air handling system 10 may alternatively or additionally include a turbine bypass valve fluidly coupled between the exhaust conduits 28 and 32 for the purpose of selectively diverting exhaust gas around the turbine 24 to thereby modulate the energy applied to the turbine 24 as described hereinabove. It will be understood that while such one or more additional actuators are not shown in FIG. 1, such actuators are known in the art and may be provided and implemented in the form of conventional actuators.

Figure 2:
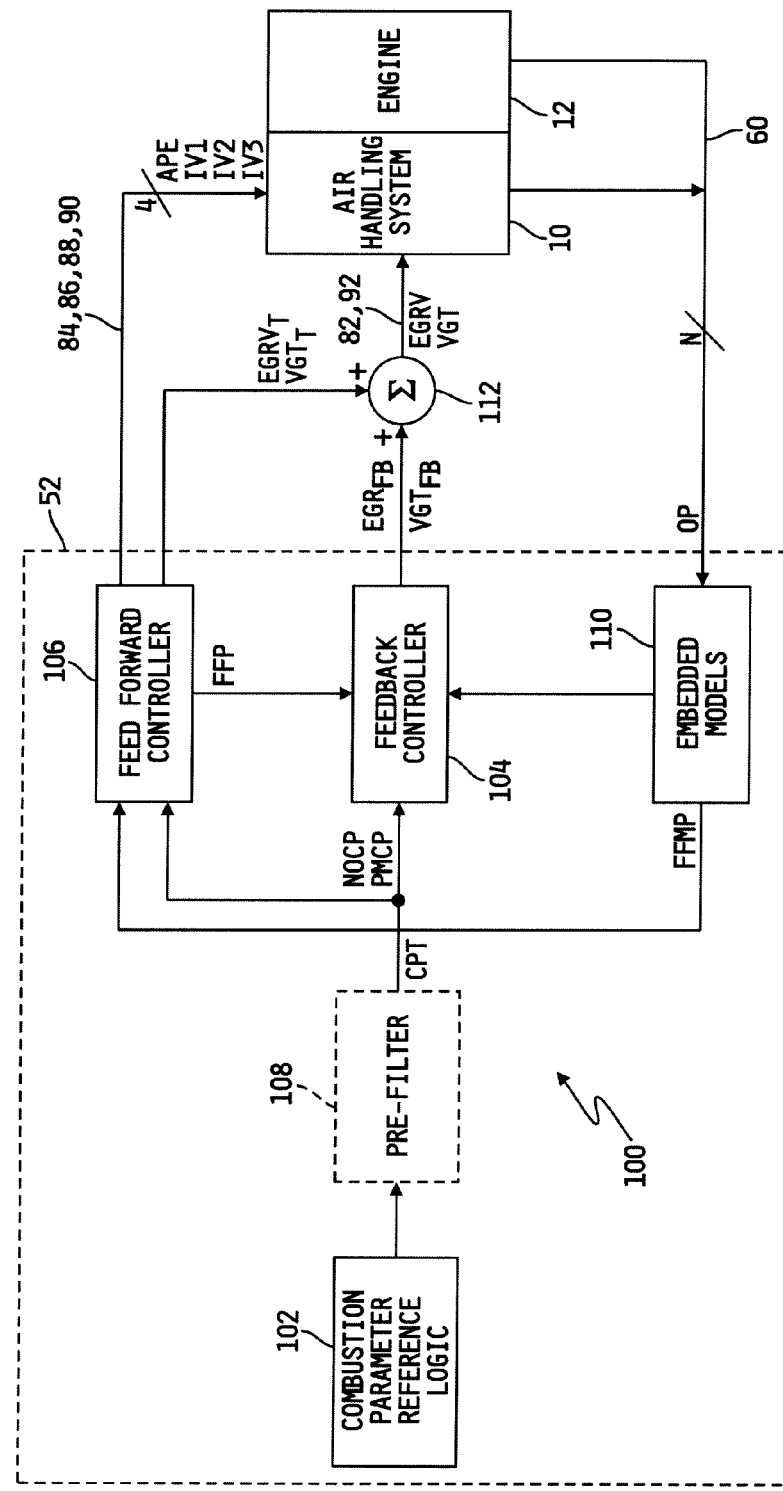
FIG. 2 is a block diagram of one illustrative embodiment of a control structure stored in the memory of the control circuit of FIG. 1 and that is executable by the control circuit to control operation of the air handling system.

Referring now to FIG. 2, one illustrative embodiment of a control structure 100 is shown for controlling the operation of the air handling system 10 illustrated in FIG. 1. The control structure 100 is illustratively stored in the memory 52 in the form of instructions that are executable by the control circuit 50 to control operation of the air handling system 10 as will be described hereinafter. In the illustrated embodiment, the control structure 100 includes a combustion parameter reference logic block 102 that produces conventional control parameter targets, CPT, in the form of, for example, at least a NOx emission control parameter, NOCP, and a particulate matter control parameter, PMCP, which are provided to a feedback controller 104 and also to a feed forward controller 106. Illustratively, NOCP and PMCP are surrogates for the NOx and particulate matter control parameters respectively, and examples of CPT generally and of NOCP and PMCP specifically, include, but are not limited to, one or any combination of recirculated exhaust gas flow rate, EGRFR, fresh air flow rate, FAF, charge flow rate, MCF, boost pressure, BOOST, oxygen content of exhaust gas (02), intake $O_2$ mole fraction and air-to-fuel ratio, AFR. Optionally, as illustrated in FIG. 2 in phantom, the control structure 100 may further include a pre-filter block 108 interposed between the combustion parameter reference logic block 102 and the feedback/feedforward controllers 104 and 106 respectively. The pre-filter block 108, if included, is illustratively used to modify the desired reference targets, i.e., the control parameter targets, CPT, based on the system response so that the system will produce the desired reference target values.

The feedback controller 104 generally receives one or more feedforward operating parameters, FFP, from the feedforward controller 106, e.g., in the form of one or more target operating parameters. The control structure 100 further includes an embedded models block 110, and operating parameters, OP, produced by the N different sensors associated with the air handling system 10 and/or engine 12 are provided to the embedded models block via the N signal paths 60. The embedded models block 110 includes a number of mathematical models that each produce a different model parameter based on one or more of the operating parameters, OP. Examples of some of the models included in the embedded models block include, but are not limited to, EGR valve position, EGRVFB, VGT rack position, VGTFB, exhaust manifold pressure, EMPFB, modeled NOx emission parameter, NOFB (modeled NOx emission value, corresponding to NOCP, which is based on one or more measured or otherwise monitored operating parameters, OP), particulate matter parameter, PMFB (modeled particulate matter value, corresponding to PMCP, which is based on one or more measured or otherwise monitored operating parameters, OP), compressor inlet temperature, CIT, and compressor inlet pressure, CIP. The embedded models 110 provide one or more such model values in the form of one or more feedback model parameters, FBMP, to the feedback controller 104, and provide one more model values in the form of one or more feedforward model parameters, FFMP, to the feedforward controller 106. In any case, the feedback controller 104 produces a feedback component, $EGR_{FB}$ of the EGR valve control signal, EGRV, and a feedback component, $VGT_{FB}$ of the VGT control signal, VGT, and provides these values to a summation block 112. The feedforward controller 106 likewise produces a feedforward or target component, $EGRV_T$, of the EGR valve control signal, EGRV, and feedforward or target component, $VGT_T$ of the VGT control signal, VGT, and provides these values to the summation block 112. The summation block 112 combines the sum of $EGR_{FB}$ and $EGRV_T$ to produce the EGR valve control signal, EGRV on the signal path 82, and likewise combines the sum of $VGT_{FB}$ and $VGT_T$ to produce the VGT control signal, VGT, on the signal path 92. The feedforward controller 106 also selectively produces the electric air pump enable signal, APE, on the signal path 84 and the inlet valve control signals IV1, IV2 and IV2 on the signal paths 86, 88 and 90 respectively.

Figure 3:
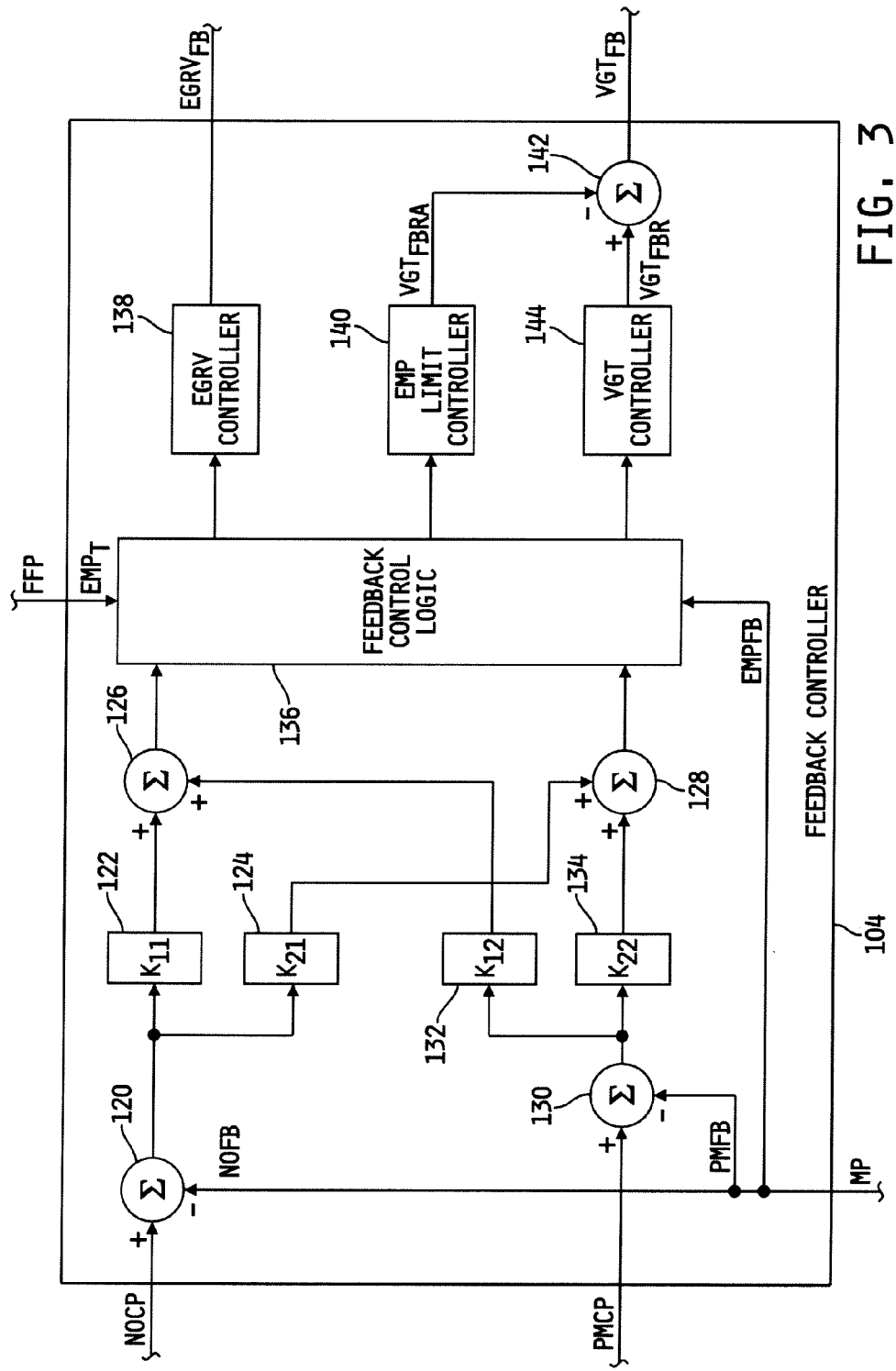
FIG. 3 is a block diagram of one illustrative embodiment of the feedback controller illustrated in FIG. 2.

Referring now to FIG. 3, one illustrative embodiment of the feedback controller 104 illustrated in FIG. 2 is shown. In the illustrated embodiment, the feedback controller 104 includes a summation node 120 having an additive input receiving the NOx emissions control parameter, NOCP, and a subtractive input receiving the modeled NOx emissions parameter, NOFB, and an output producing the value NOCP−NOFB. The output of the summation node 120 is provided to first and second weighting parameter multiplication blocks 122 and 124 respectively. The multiplication block 122 multiplies the output of the summation node 120 by a weighting parameter $K_{11}$, and the resulting value, $K_{11}*(NOCP-NOFB)$ is provided to an additive input of another summation node 126. The multiplication block 124 similarly multiplies the output of the summation node 120 by a weighting parameter $K_{21}$, and the resulting value, $K_{21}*(NOCP--NOFB)$ is provided to an additive input of yet another summation node 128. The feedback controller 104 further includes another summation node 130 having an additive input receiving the particulate matter control parameter, PMCP, and a subtractive input receiving the modeled particulate matter parameter, PMFB, and an output producing the value PMCP−PMFB. The output of the summation node 130 is provided to third and fourth weighting parameter multiplication blocks 132 and 134 respectively. The multiplication block 132 multiplies the output of the summation node 130 by a weighting parameter $K_{12}$, and the resulting value, $K_{12}*(PMCP-PMFB)$ is provided to another additive input of the summation node 126. The output of the summation node 126, $K_{11}*(NOCP-NOFB)+K_{12}*(PMCP-PMFB)$, is provided to one input of a feedback control logic block 136. The multiplication block 134 similarly multiplies the output of the summation node 130 by a weighting parameter $K_{22}$, and the resulting value, $K_{22}*(PMCP-PMFB)$ is provided to another additive input of the summation node 128. The output of the summation node 128, $K_{21}*(NOCP-NOFB)+K_{22}*(PMCP-PMFB)$, is provided to another input of the feedback control logic block 136.

In the illustrated embodiment, a single feedforward parameter, FFP, e.g., target exhaust manifold pressure, $EMP_T$, is also provided as an input to the feedback control logic block 136, as is the corresponding model parameter (FBMP) in the form of the measured or modeled exhaust manifold pressure value EMPFB. An output of the feedback control logic block 136 is provided as an input to an EGRV controller 138, the output of which is the feedback component of EGR valve control signal, $EGRV_{FB}$. Another output of the feedback control logic block 136 is provided as an input to an exhaust manifold pressure (EMP) limit controller 140, the output of which is a VGT rack position adjustment value, $VGT_{FBRA}$, and is provided to a subtractive input of a summation node 142, and yet another output of the feedback control logic block 136 is provided as an input to a VGT controller 144, the output of which is a VGT rack position value, $VGT_{FBR}$, and is provided to an additive input of the summation node 142. The output of the summation node 142 is the feedback component of the VGT control signal, $VGT_{FB}$, and represents the output of the VGT controller 144 limited by the output of the EMP limit controller 142, or $VGT_{FB} = VGT_{FBR} - VGT_{FBRA}$.

The feedback controller 104 is used in a conventional manner to reduce system performance variability by continually correcting for model errors and compensating for unknown disturbances. The feedback controller 104 illustrated in FIG. 3 is illustratively structured with generic inputs, NOCP and PMCP, and incorporates weighting compensators or parameters, $K_{11}$, $K_{12}$, $K_{21}$ and $K_{22}$ that may be calibrated such that NOCP or PMCP wins in situations where both reference targets cannot be achieved simultaneously. In the feedback controller 104 illustrated in FIG. 3, the generic air handling control spaces are represented as the NOx control parameter, NOCP and the particulate matter control parameter, PMCP. The NOx emissions control parameter, NOCP, and the modeled NOx emissions parameter, NOFB, represent the control parameter that strongly correlates with NOx emissions, and the particulate matter control parameter, PMCP, and the modeled particulate matter parameter, PMFB, represent the control parameter that strongly correlates with particulate emissions. The weighting parameters, $K_{11}$, $K_{12}$, $K_{21}$ and $K_{22}$ represent the sensitivity between the corresponding actuator command and the control variable. In one illustrative example, NOCP may be an EGR flow rate target, EGRFR, and NOFB may be the modeled or measured EGR flow rate, and PMCP may be a charge flow rate target and PMFB may be the modeled or measured charge flow rate. In this illustrative example, $K_{11}$ may represent the extent of closing the EGR valve 38 to increase boost by speeding up the rotational speed of the turbocharger 18, and $K_{21}$ may represent the extent of using the VGT to build back pressure for EGR flow. Similarly, $K_{21}$ may represent the position of the EGR valve 38 to achieve the charge flow target while $K_{22}$ may represent the position of the VGT actuator to achieve the same. The weighting compensators or parameters, $K_{11}$, $K_{12}$, $K_{21}$ and $K_{22}$, may be constants, linearly dynamic or non-linearly dynamic.

Illustratively, partial derivatives can be used to estimate the weighting factors at a given engine operation as follows:

$K_{11} = \partial u NOx / \partial NOCP$ $K_{12} = \partial u NOx / \partial PMCP$ $K_{21} = \partial u PM / \partial NOCP$ $K_{22} = \partial u PM / \partial PMCP$, where, uNOx is the NOx control actuation command, e.g., EGRV, and uPM is the particulate matter control actuation command, e.g., VGT.

The feedback control logic block 136 contains control logic for selecting the error signals to be fed to the various controllers 138, 140 and 144. In the illustrated embodiment, for example, the EGR valve control error, $E_{EGRVC}$, provided as the input to the EGRV controller 138 is set by the logic block 136 to the value of the output of the summation block 126, i.e., $E_{EGRVC} = K_{11}*(NOCP-NOFB)+K_{12}*(PMCP-PMFB)$. The EGRV controller 138 is illustratively a PID controller producing the feedback component of the EGRV control signal, $EGRV_{FB}$, according to the equation $EGRV_{FB} = K_{EGRp}*E_{EGRVC} + K_{EGRi}*\int E_{EGRVC}\,dt +$ $K_{EGRd}*dE_{EGRVC}/dt$, where $K_{EGRp}$ is the proportional gain, $K_{EGRi}$ is the integral gain and $K_{EGRd}$ is the derivative gain. It will be understood that the EGRV controller 138 may alternatively be provided in the form of another conventional controller such as a PI controller or other known controller.

In the illustrated embodiment, the VGT control error, $E_{VGTC}$, provided as the input to the VGT controller 144 is set by the logic block 136 to the value of the output of the summation block 128, i.e., $E_{VGTC} = K_{21}*(NOCP-NOFB) + K_{22}*(PMCP-PMFB)$. The VGT controller 144 is illustratively a PID controller producing a feedback component of the VGT rack position control signal, $VGT_{FBR}$, according to the equation $VGT_{FBR} = K_{VGTp}*E_{VGTC} + K_{VGTi}*\int E_{VGTC}\,dt + K_{VGTd}*dE_{VGTC}/dt$, where $K_{VGTp}$ is the proportional gain, $K_{VGTi}$ is the integral gain and $K_{VGTd}$ is the derivative gain. It will be understood that the VGT controller 144 may alternatively be provided in the form of another conventional controller such as a PI controller or other known controller.

In the illustrated embodiment, the exhaust manifold pressure control error, $E_{EMPC}$, provided as the input to the EMP limit controller 140 is set by the logic block 136 to the value of the difference between the exhaust manifold pressure target, $EMP_T$ and the measured or modeled value of the exhaust manifold pressure, EMPFB, or $E_{EMPC} = EMP_T - EMPFB$. The EMP limit controller 140 is illustratively a PID controller producing a VGT rack position adjustment signal, $VGT_{FBRA}$, according to the equation $VGT_{FBRA} = K_{EMPC}*E_{EMPC} + K_{EMPi}*\int E_{EMPC}\,dt + K_{EMPd}*dE_{EMPC}/dt$, where $K_{EMPp}$ is the proportional gain, $K_{EMPi}$ is the integral gain and $E_{EMPd}$ is the derivative gain. It will be understood that the EMP limit controller 140 may alternatively be provided in the form of another conventional controller such as a PI controller or other known controller. In any case, the feedback component of the VGT control signal, $VGT_{FB}$, is the difference between $VGT_{FBR}$ and $VGT_{FBRA}$, or $VGT_{FB} = VGT_{FBR} - VGT_{FBRA}$.

It will be understood that in embodiments of the air handling system 10 that include one or more additional actuators as described hereinabove, the feedback controller 104 may likewise include one or more additional controllers that receive error inputs from the feedback control logic block 136. For example, in some embodiments the air handling system 10 may include an intake assist throttle positioned in-line with the air intake conduit 20 for the purpose of modulating fresh air flow through the engine system as described hereinabove. In such embodiments, the feedback controller 104 may include an intake assist throttle feedback controller receiving an intake assist throttle controller parameter error from the logic block 136, which may be the output of the summation node 126 under some operating conditions and the output of the summation node 128 under other operating conditions, and producing a feedback component of an intake assist throttle control signal according to a PID function as described hereinabove or according to a PI or other known controller function. In some embodiments the air handling system 10 may alternatively or additionally include a turbine bypass valve fluidly coupled between the exhaust conduits 28 and 32 for the purpose of selectively diverting exhaust gas around the turbine 24 to thereby modulate the energy applied to the turbine 24 as described hereinabove. In such embodiments, the feedback controller 104 may include a turbine bypass valve feedback controller receiving a turbine bypass valve controller parameter error from the logic block 136, which may be, for example the difference between a target and measured (or modeled) turbocharger rotational speed under some operating conditions and the output of the summation node 128 under other operating conditions, and producing a feedback component of a turbine bypass valve control signal according to a PID function as described hereinabove or according to a PI or other known controller function.

Figure 4:
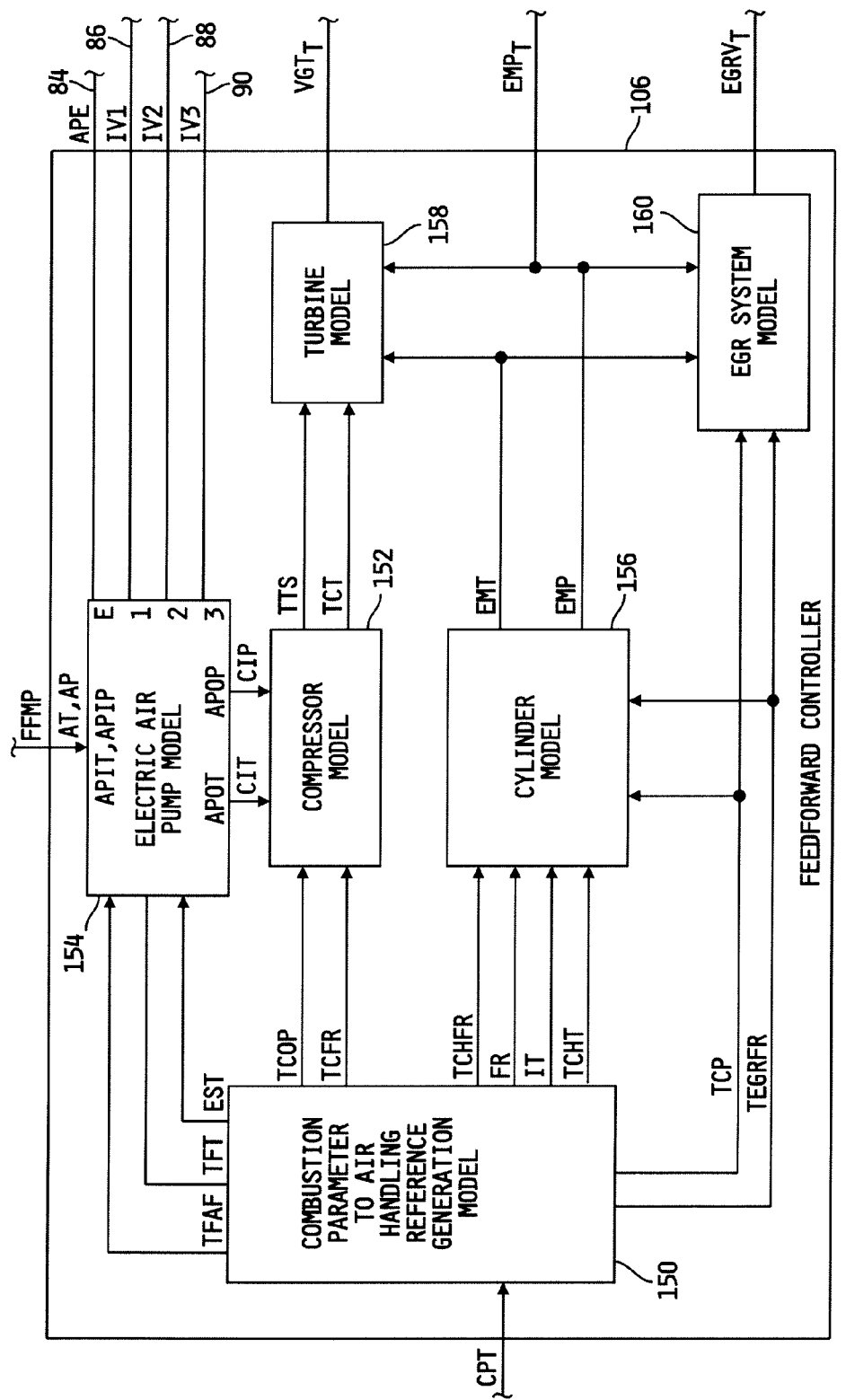
FIG. 4 is a block diagram of one illustrative embodiment of the feedforward controller illustrated in FIG. 2.

Referring now to FIG. 4, one illustrative embodiment of the feedforward controller 106 illustrated in FIG. 2 is shown. In the illustrated embodiment, the feedforward controller 106 includes a combustion parameter to air handling reference generation model 150 that receives as inputs the various control parameter targets, CPT, produced by the combustion parameter reference logic block 102 of FIG. 2. The combustion parameter to air handling reference generation model includes a number of conventional equations, maps, lookup tables or the like that translate or otherwise convert combustion references included in the CPT, e.g., fresh air flow rate, charge flow rate, EGR flow rate and intake $O_2$ mole fraction, to turbocharger-machinery references or targets such as a target fresh air flow rate, TFAF, a target compressor outlet pressure, TCCP, and a target compressor flow rate, TCFR, and cylinder and manifold references or targets such as a target charge flow rate, TCHFR, a target fueling rate, FR, a total fueling target, TFT, an engine speed target, EST, a target injection timing, IT, a target charge temperature, TCHT, a target charge pressure, TCP, and a target EGR flow rate, TEGRFR. The feedforward controller 106 further includes a compressor model 152 that receives as inputs the target compressor outlet pressure, TCCP, and the target compressor flow rate, TCFR, and in the illustrated embodiment further receives as inputs from an electric air pump model 154 a compressor inlet temperature, CIT, and a compressor inlet pressure, CIP. The compressor model 152 includes an embedded model of the compressor 16 which computes a target compressor rotational speed, which is the same as the turbine rotational speed and is therefore labeled in FIG. 4 as a target turbocharger speed, TTS, and a target compressor torque, TCT. Further details relating to one illustrative embodiment of the compressor model 132 will be described hereinafter with respect to FIGS. 5-7.

The electric air pump model 154 receives as inputs the target fresh air flow rate, TFAF, the total fueling target, TFT, the engine speed target, EST, and the embedded models 110 feedforward model parameters, FFMP, in the form of measured or modeled values of ambient temperature, AT, and ambient pressure, AP. The ambient temperature, AT, is, for purposes of the electric air pump model 154, an air pump inlet temperature, APIT, and the ambient pressure, AP, is an air pump inlet pressure, APIP. The electric air pump model 154 includes an embedded model of the electric air pump 42 which computes an air pump outlet pressure (APOP) and air pump outlet temperature (APOT) corresponding to the pressure and temperature of air produced by the electric air pump 42 based on ambient air pressure and temperature and on one or more physical characteristics of the electric air pump 42. The air pump outlet temperature, APOT, is the compressor inlet temperature, CIT, of the compressor model 152, and the air pump outlet pressure, APOP, is the compressor inlet pressure, CIP, of the compressor model 152. The electric air pump model further determines appropriate settings for the air intake valves 70, 76 and 78 as well as enabling and disabling of the electric air pump 42, and produces the electric air pump enable command, APE, as well as the air intake valve control signals IV1, IV2 and IV3. Further details relating to one illustrative embodiment of the electric air pump model 154 will be described hereinafter with respect to FIGS. 8-10.

The feedforward controller 106 further includes a cylinder model 156 that receives as inputs the target charge flow rate, TCHFR, a target fueling rate, FR, a target injection timing, IT, a target charge temperature, TCHT, a target charge pressure, TCP, and a target EGR flow rate, TEGRFR produced by the combustion parameter to air handling reference generation model 150. The cylinder model 156 includes a model that estimates desired (target) exhaust manifold temperature, EMT, (i.e., turbine inlet temperature) and desired (target) exhaust manifold pressure, EMP, (i.e., turbine inlet pressure) from the foregoing air handling and fuel injection references. Further details relating to one illustrative embodiment of the cylinder model 156 is described in co-pending U.S. patent application Ser. No. 13/244,550, having the disclosure of which is incorporated herein by reference in its entirety.

The feedforward controller 106 further includes a turbine model 158 that receives as inputs the target turbocharger speed, US, and the target compressor torque, TCT, produced by the compressor model 152, as well as the target exhaust manifold temperature, EMT, and the target exhaust manifold pressure target, EMP, produced by the cylinder model 156. The turbine model 258 includes an embedded model of the turbine 24 which estimates the feedforward or target component, $VGT_T$ of the VGT control signal, VGT. Further details relating to one illustrative embodiment of the turbine model 136 will be described in detail hereinafter with respect to FIGS. 11-15.

The feedforward controller 106 further includes an EGR system model 160 that receives as inputs the target charge pressure, TCP, and the target EGR flow rate, TEGRFR, produced by the combustion parameter to air handling reference generation model 150, as well as the target exhaust manifold temperature, EMT, and the target exhaust manifold pressure target, EMP, produced by the cylinder model 156. The EGR system model 160 includes an embedded model that illustratively uses conventional momentum and Bernoulli equations to determine a position of the EGR valve 38 relative to a reference position that will meet the EGR flow reference targets, and to produce a corresponding EGR valve target signal, $EGR_T$.

Figure 5:
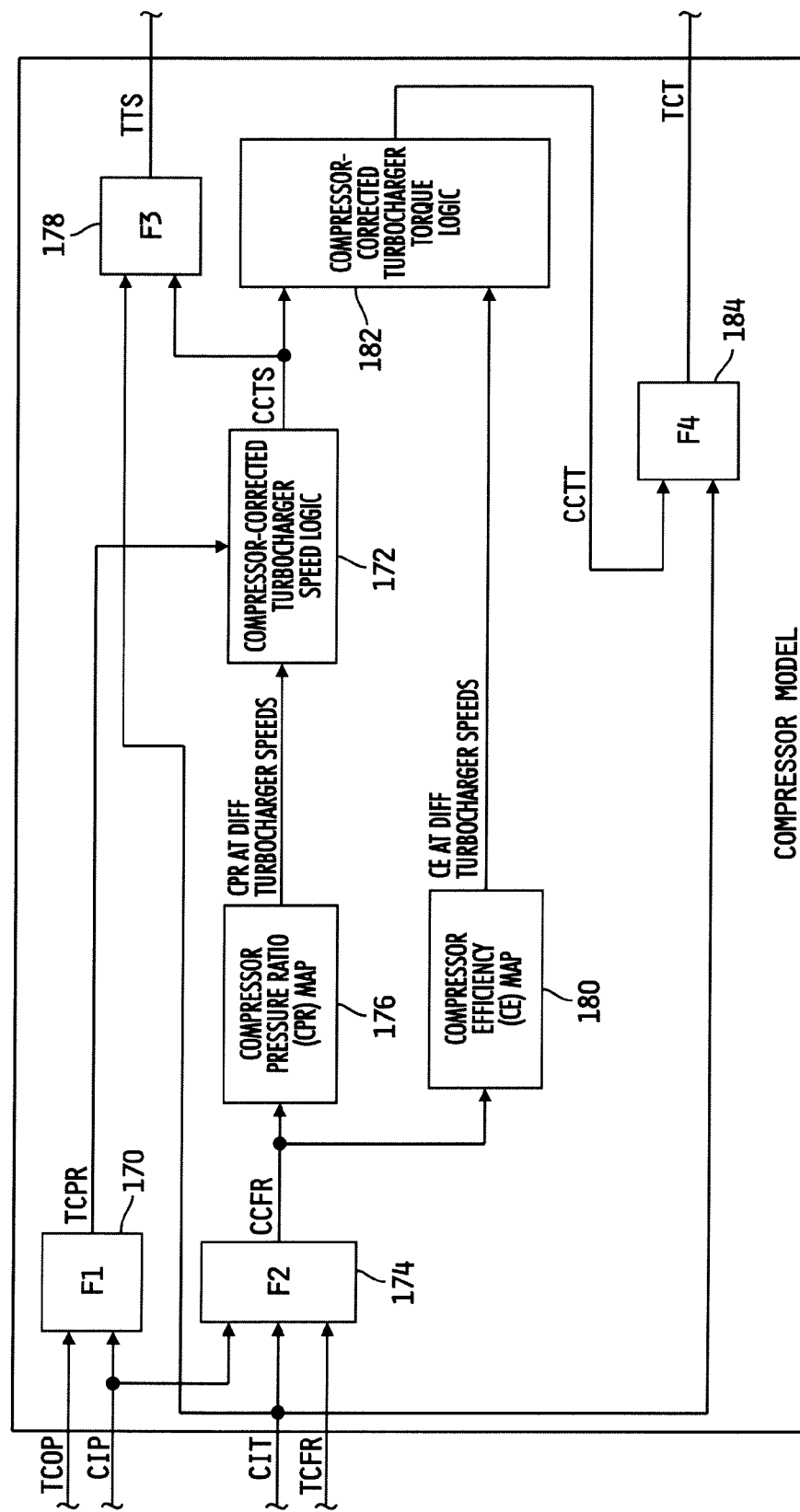
FIG. 5 is a block diagram of one illustrative embodiment of the compressor model illustrated in FIG. 4.

Referring now to FIG. 5, one illustrative embodiment of the compressor model 152 illustrated in FIG. 4 is shown. In the illustrated embodiment, the compressor model 152 includes a function block 170 receiving as inputs the target compressor outlet pressure, TCCP, and the compressor inlet pressure, CIP, and producing as an output a target compressor pressure ratio, TCPR. Illustratively, the function, F1, stored in the function block 170 produces TCPR in accordance with the equation TCPR=TCCP/CIP. The target compressor ratio, TCPR, is provided as an input to a compressor-corrected turbocharger speed logic block 172. The compressor model 152 further includes another function block 174 receiving as inputs the compressor inlet pressure, CIP, the compressor inlet temperature, CIT, and the target compressor flow rate, TCFR, and produces as an output a compressor corrected compressor flow rate CCCFR. Illustratively, the function, F2, stored in the function block 174 produces CCCFR in accordance with the equation CCCFR=TCFR*SQRT(CIT/$T_{STD}$)* (CIP/$P_{STD}$), where $T_{STD}$ is a standard reference temperature, e.g., 25 degrees C. or other reference temperature, and $P_{STD}$ is a standard reference pressure, e.g., 101.3 kPa or other reference pressure. Alternatively, this disclosure contemplates other embodiments in which F1 and/or F2 includes more, fewer and/or different input parameters.

The compressor corrected compressor flow rate, CCCFR, is provided as an input to another functional block 176 that illustratively has stored therein a conventional compressor pressure ratio map corresponding to the specific configuration of the turbocharger 18. Generally, the compressor pressure ratio map is designed to map values of CCCFR to compressor pressure ratio values at a plurality of different turbocharger operating speeds. The functional block 176 is illustratively operable to process CCCFR using the compressor pressure map to generate a number of pairs of compressor pressure ratio and turbocharger operating speed values.

Figure 6:
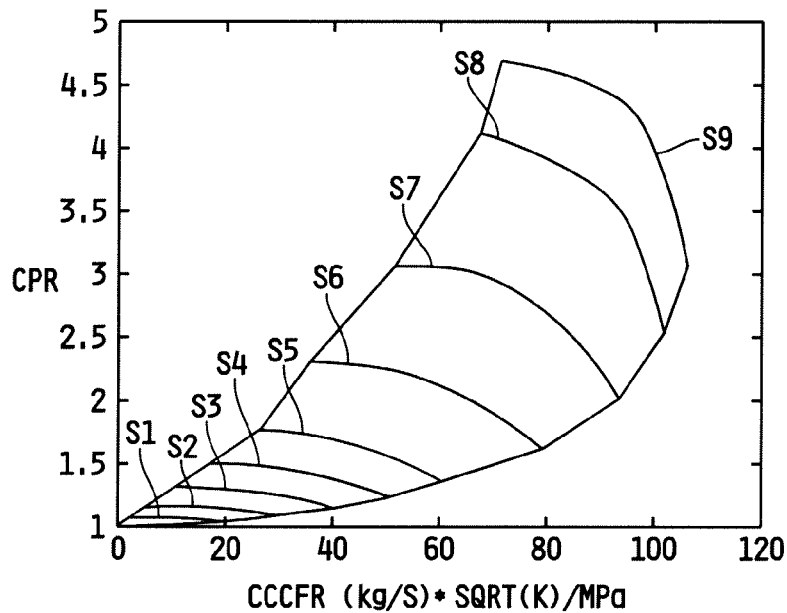
FIG. 6 is a plot of one illustrative example of the compressor pressure ratio map illustrated in FIG. 5.

Referring now to FIG. 6, an example of one such compressor pressure ratio map is shown. In the illustrated embodiment, the compressor pressure ratio map maps compressor corrected compressor flow rate values, CCCFR, to compressor pressure ratio values, CPR, at a plurality of different turbocharger operating speeds, where the contours $S_1$-$S_9$ represent lines of different, constant turbocharger operating speeds. With the compressor pressure ratio map, any one value of CCCFR thus produces a number, M, of different compressor pressure ratio, CPR, and turbocharger operating speed, TS, pairs $(CPR, TS)_1, \ldots, (CPR, TS)_M$, where M may be any positive integer.

Referring again to FIG. 5, the target compressor pressure ratio, TCR, produced by the functional block 170 and the number of pairs of compressor pressure ratio and turbocharger operating speed values, $(CPR, TS)_{1-M}$, produced by the functional block 176 are provided as inputs to another functional block 172. The functional block 172 processes a function of at least two of the $(CPR, TS)_{1-M}$ pair values and the TCR value to produce a compressor-corrected turbocharger speed estimate, CCTS. In one embodiment, for example, two of the $(CPR, TS)_{1-M}$ pair values are selected with one pair having a CPR value that is less than TCR and the other pair having a CPR value that is greater than TCR, and a conventional interpolation technique is used to determine a CCTS value that corresponds to TCR. In embodiments in which the function of the two $(CPR, TS)_{1-M}$ pair values is linear, or can be acceptably approximated by a linear function, a conventional linear interpolation technique may be used to determine CCTS. Alternatively, in embodiments in which the function of the two $(CPR, TS)_{1-M}$ pair values is non-linear, a conventional non-linear interpolation technique may be used to determine CCTS.

In another example embodiment, the functional block 172 may be configured to process the number of $(CPR, TS)_{1-M}$ pair values to generate a continuous or piece-wise continuous profile of compressor-corrected turbocharger operating speeds as a function of compressor pressure ratios. The profile may illustratively be linear or non-linear. In this embodiment, the functional block 172 is then operable to map TCR to CCTS using the generated profile. It will be appreciated that one or more other conventional processing techniques may alternatively be used to process the number of $(CPR, TS)_{1-M}$ pair values and TCR to determine CCTS, and any such alternate processing techniques are contemplated by this disclosure.

The compressor model 152 illustrated in FIG. 5 further includes another functional block 178 that receives as inputs the compressor inlet temperature signal, CIT, and the compressor corrected turbocharger speed estimate, CCTS, and produces as an output an estimate of the target turbocharger speed, TTS. Illustratively, the functional block 178 processes CIT and CCTS according to a function F3 to produce an estimate of the target turbocharger speed, TTS, and in one illustrative embodiment the function F3 is given by the equation TTS=CCTS*SQRT(CIT/$T_{STD}$), where $T_{STD}$ is as described herein above.

The compressor corrected compressor flow rate, CCCFR, produced by the functional block 174 is also provided as an input to another functional block 180 that illustratively has stored therein a conventional efficiency map corresponding to the specific configuration of the turbocharger 18. Generally, the compressor efficiency map is designed to map values of CCCFR to compressor efficiency (percentage) values at a plurality of different turbocharger operating speeds. The functional block 180 is illustratively operable to process CCCFR using the compressor efficiency map to generate a number of pairs of compressor pressure ratio and turbocharger operating speed values.

Figure 7:
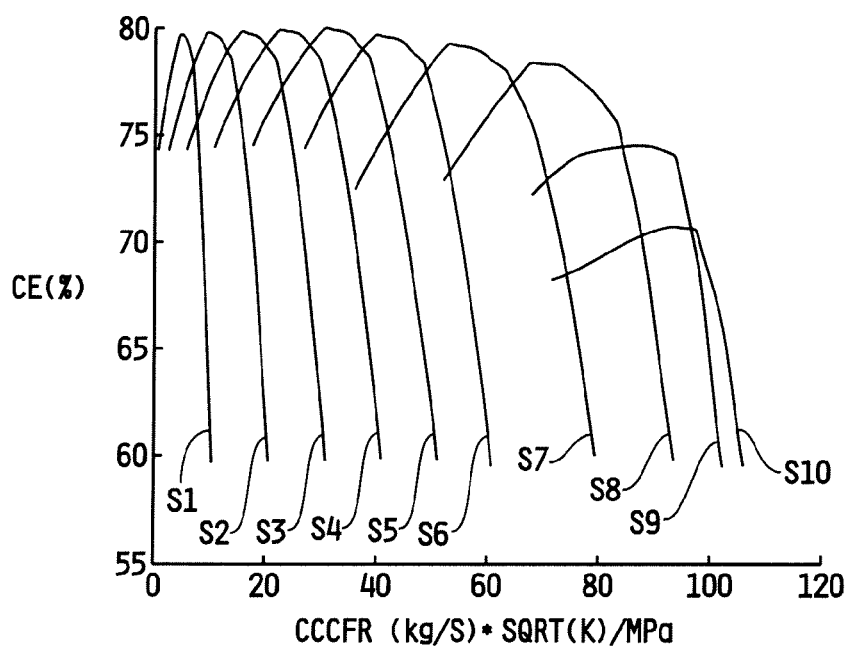
FIG. 7 is a plot of one illustrative example of the compressor efficiency map illustrated in FIG. 5.

Referring now to FIG. 7, an example of one such compressor efficiency map is shown. In the illustrated embodiment, the compressor efficiency map maps compressor corrected compressor flow rate values, CCCFR, to compressor efficiency values, CE, at a plurality of different turbocharger operating speeds, where the contours $S_1$-$S_{10}$ represent lines of different, constant turbocharger operating speeds. With the compressor pressure ratio map, any one value of CCCFR thus produces a number, K, of different compressor efficiency, CE, and turbocharger operating speed, TS, pairs $(CE, TS)_1, \ldots, (CE, TS)_K$, where K may be any positive integer.

Referring again to FIG. 5, the compressor corrected turbocharger speed, CCTS, produced by the functional block 172 and the number of pairs of compressor efficiency and turbocharger operating speed values, $(CE, TS)_{1-K}$, produced by the functional block 160 are provided as inputs to another functional block 182. Similarly to the functional block 172, the functional block 182 processes a function of at least two of the $(CE, TS)_{1-K}$ pair values and the CCTS value to produce a compressor corrected turbocharger torque estimate, CCTT. In one embodiment, for example, two of the $(CE, TS)_{1-K}$ pair values are selected with one pair having a TS value that is less than CCTS and the other pair having a TS value that is greater than CCTS, and a conventional interpolation technique is used to determine a CCTT value that corresponds to CCTS. In embodiments in which the function of the two $(CE, TS)_{1-K}$ pair values is linear, or can be acceptably approximated by a linear function, a conventional linear interpolation technique may be used to determine CCTT. Alternatively, in embodiments in which the function of the two $(CE, TS)_{1-K}$ pair values is non-linear, a conventional non-linear interpolation technique may be used to determine CCTT. Alternatively still, the functional block 182 may be configured to process the number of $(CE, TS)_{1-K}$ pair values to generate a continuous or piece-wise continuous profile of compressor-corrected turbocharger operating torques as a function of compressor efficiencies, and such a profile can be processed as described above with respect to the functional block 172 to determine CCTT.

Referring again to FIG. 5, the compressor model 152 further includes another functional block 184 that receives as inputs the compressor inlet temperature signal, CIT, and the compressor corrected turbocharger torque estimate, CCTT, and produces as an output an estimate of the target compressor torque, TCT. Illustratively, the functional block 184 processes CIT and CCTT according to a function F4 to produce an estimate of the target compressor torque, TCT, and in one illustrative embodiment the function F4 is given by the equation TCT=CCTT*SQRT(CIT/$T_{STD}$), where $T_{STD}$ is as described herein above.

Figure 8:
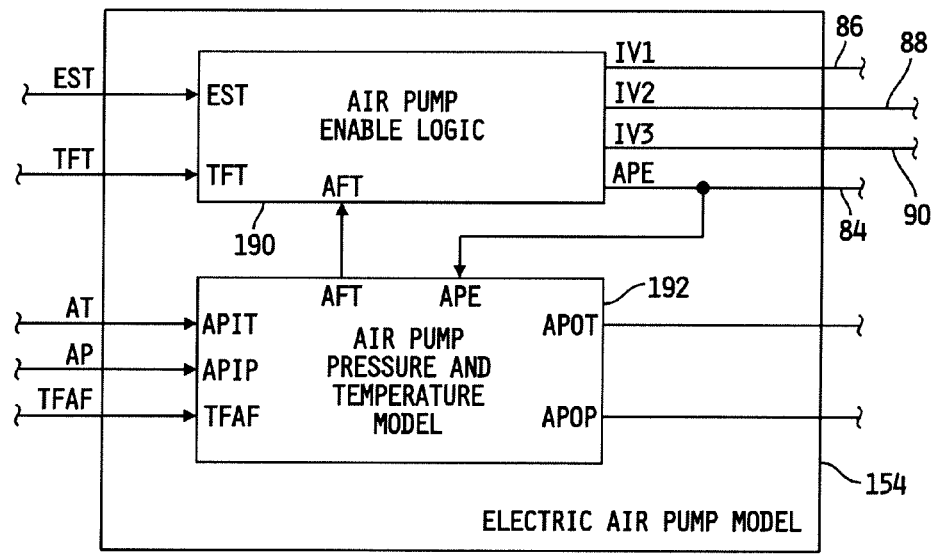
FIG. 8 is a block diagram of one illustrative example of the electric air pump model illustrated in FIG. 4.

Referring now to FIG. 8, one illustrative embodiment of the electric air pump model 154 is shown. In the illustrated embodiment, the electric air pump model includes an air pump enable logic block 190 and an air pump pressure and temperature model 192. The air pump enable logic block 190 illustratively receives as inputs the engine speed target, EST, the total fuel target, TFT, and an air flow target, AFT produced by the air pump pressure and temperature model 192. The air pump enable logic block 190 includes logic which processes the foregoing input target values and determines when to enable and disable operation of the electric air pump 42, and produces the corresponding air pump enable signal, APE, as well as the air intake valve control signals IV1, IV2 and IV3 for controlling the air intake valves 70, 74 and 78 consistently with the enabling and disabling of the electric air pump 42. Further details relating to one illustrative embodiment of the air pump enable logic block 190 will be described in detail hereinafter with respect to FIG. 9. The air pump pressure and temperature model 192 receives as inputs the ambient air temperature, AT, (or air pump inlet temperature, APIT, in terms of the model 192), the ambient air pressure, AP, (or air pump inlet pressure, APIP), the target fresh air flow rate, TFAF, and the air pump enable value, APE, produced by the air pump enable logic block 190. The air pump pressure and temperature model 192 illustratively computes the air pump outlet pressure, APOP, and air pump outlet temperature, APOT, as a function of APIT, APIP and TFAF when the electric air pump 42 is enabled, i.e., when the electric air pump is operating, and when the electric air pump is disabled APIP=AP and APIT=AT. Further details relating to one illustrative embodiment of the air pump pressure and temperature model 192 will be described in detail hereinafter with respect to FIG. 10.

Figure 9:
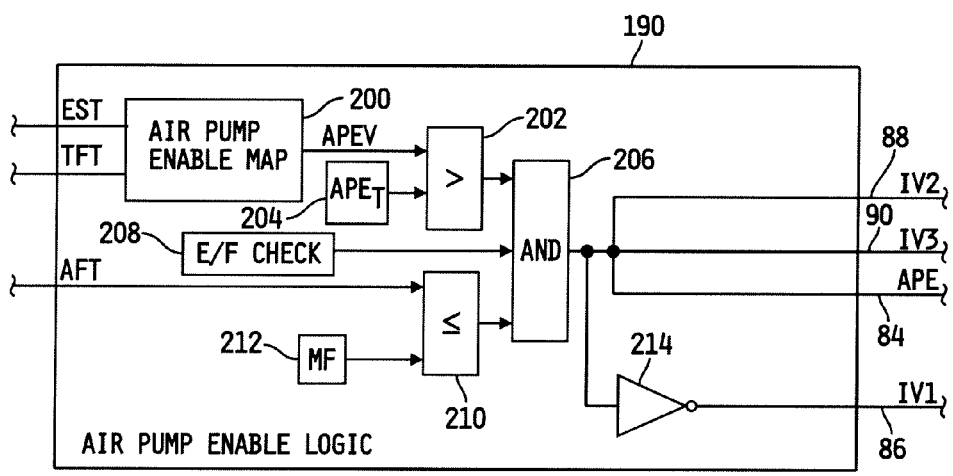
FIG. 9 is a block diagram of one illustrative embodiment of the air pump enable logic block illustrated in FIG. 8.

Referring now to FIG. 9, one illustrative embodiment of the air pump enable logic block 190 is shown. The air pump enable logic 190 illustratively includes an air pump enable map 200 receiving as inputs the engine speed target, EST, and the total fueling target, TFT. The air pump enable logic 190 processes EST and TFT to determine and produce an air pump enable value, APEV as a function thereof. Illustratively, the air pump enable logic 190 produces increasing air pump enable values if EST with increasing rapidly engine speed target and/or total fueling target values which is/are indicative of engine speed and/or total fueling transient events. Those skilled in the art will recognize other strategies for producing the air pump enable value, APEV, as a function of EST and TFT, and other such strategies are contemplated by this disclosure. In any case, the air pump enable value, APEV, is provided to a high side input of a "greater than" logic block 202 having a low side input receiving a threshold air pump enable value, $APE_T$, stored in a memory location 204. If the air pump enable value, APEV, is greater than $APE_T$, the output of the "greater than" block is "1," such that APEV represents a significant transient increase in EST and/or TFT, and is otherwise zero. The output of the "greater than" block 202 is provided as one input of an "AND" block 206. Another input of the AND block 206 receives an engine and fueling check value, E/F CHECK, from a functional block 208 which is a "1" if a conventional engine and fueling check algorithm indicates normal engine and fueling operation, and is otherwise a "0." In alternate embodiments, the functional block 208 may be omitted and/or replaced by one or more different operational requirements.

The air flow target value, AFT, produced by the air pump pressure and temperature model 192 is provided as a high-side input to a "less than or equal" logic block 210 having a low-side input receiving a maximum air flow value, MF, stored in a memory location 212. As long as the air flow target value, AFT, is less than or equal to the maximum air flow value, MF, the output of the "less than or equal to" logic block 210 is "1" and is otherwise "0." The output of the "less than or equal to" block 210 is provided as a third input to the AND block 206 such that the output of the AND block is "1" only if the air pump enable value, APEV, is greater than the air pump enable threshold value, $APE_T$, the engine/fuel check value is "1" and the air flow target value, AFT, is less than or equal to the maximum flow value, MF, and is otherwise "0." The output of the AND block is provided as the air pump enable value, APE, produced by the control circuit 50 on the signal path 84, and is also the air intake valve control signals, IV2 produced by the control circuit 50 on the signal path 88 and IV3 produced by the control circuit 50 on the signal path 90. The output of the AND block 206 is also provided as an input to an inverter 214, and the output of the inverter 214 is the air intake valve control signal, IV1, produced by the control circuit 50 on the signal path 86. Thus, control circuit 50 activates the air pump 42, opens the air intake valves 74 and 78 and closes the air intake valve 70 when the air pump enable value, APEV, is greater than the air pump enable threshold value, $APE_T$, the engine/fuel check value is "1" (engine and fuel check passed) and the air flow target value, AFT, is less than or equal to the maximum flow value, MF. Otherwise, the control circuit deactivates the air pump 42, closes the air intake valves 74 and 78 and opens the air intake valve 70.

Figure 10:
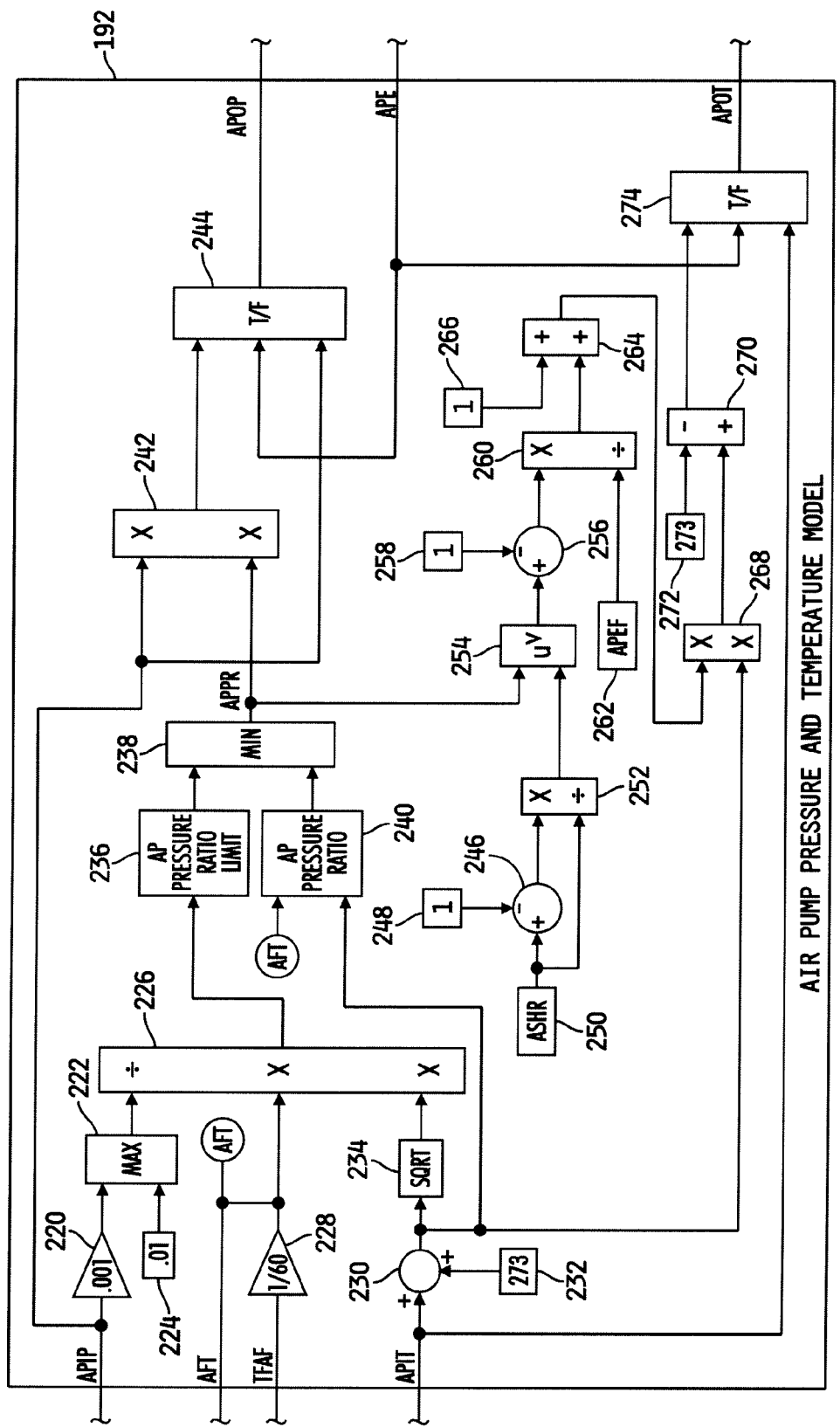
FIG. 10 is a block diagram of one illustrative embodiment of the air pump pressure and temperature model illustrated in FIG. 8.

Referring now to FIG. 10, one illustrative embodiment of the air pump pressure and temperature model 192. In addition to producing the air flow target value, AFT, used by the air pump enable logic 190, the air pump pressure and temperature model 192 also produces the air pump outlet pressure value, APOP, and air pump outlet temperature value, APOT, used by the compressor model 152 as described hereinabove such that when the air pump 42 is operational APOP corresponds to the pressure of air produced at the air outlet of the air pump 42 and APTO corresponds to the temperature of air produced at the air outlet of the air pump 42, and when the air pump 42 is not operational APOP corresponds to the ambient air pressure, AP, and APTO corresponds to ambient air temperature, AT. In the illustrated embodiment, the air pump pressure and temperature model 190 includes a multiplication block 220 which multiplies the air pump inlet pressure, APIP, i.e., ambient air pressure, AP, by 0.001, and the output of the multiplication block 220 is provided as a high-side input to a MAX block 222. A low-side input of the MAX block 222 receives the value 0.01 stored in the memory location 224, and the output of the MAX block is thus the greater of APIP*0.001 and 0.01. The output of the MAX block 222 is provided to a division input of an arithmetic block 226. The target fresh air flow value, TFAF, is provided as an input to another multiplication block 228 which multiplies TFAF by the value 1/60. The output of the multiplication block 228 is the air flow target value, AFT, provided to the air pump enable logic 190 and also used internally to the air pump pressure and temperature model 192. Within the air pump pressure and temperature model 192, AFT is provided as a multiplication input to the arithmetic block 226.

The air pump pressure and temperature model 190 further includes a summation block 230 receiving the air pump inlet temperature, APIT, i.e., ambient air temperature, AT, at one additive input and the value 273 stored in the memory location 232 at another additive input. The sum of APIT and 273 is provided to an input of a square root block 234 having an output that serves as another multiplication input to the arithmetic block 226. The output of the arithmetic block 226 is thus the value [(TFAF/60)*SQRT(APIT+273)]/MAX(APIP*0.001, 0.01), and is provided as an input to an air pump pressure ratio limit block 236. The values AFT and (APIT+273) are provided as separate inputs to an air pump pressure ratio block 240, and the outputs of the blocks 236 and 240 are provided as inputs respectively to a MIN block 238. The air pump pressure ratio target, APPR, produced by the air pump pressure ratio block 240 is a function of AFT and APIT, which is modeled based on specific geometries and flow capabilities of the particular air pump 42 being used. The air pump pressure ratio limit produced by the air pump pressure ratio limit block 236 is illustratively a decreasing function of $[(TFAF/60)*SQRT(APIT+273)]/MAX(APIP*0.001, 0.01)$. The minimum of these values is the modeled air pump pressure ratio, APPR, and is provided as one input to a multiplication block 242 having another input receiving the air pump inlet pressure, APIP. The product APIP*APPR is the output of the multiplication block 242, and is provided to a "true" input of a true/false block 244. The air pump inlet pressure, APIP, is provided to the "false" input of the true/false block 244, and the air pump enable value, APE, produced by the air pump enable logic 190 is the control input of the true/false block 244. Thus, if APE=1 such that the air pump 42 is activated and operational, the true/false block 244 produces the product APIP*APPR as the air pump outlet pressure, APOP. If APE=0 such that the air pump is deactivated and therefore not operational, the true/false block 244 produces APIP, i.e., AP, as the air pump outlet pressure APOP.

The output of the MIN block 238 is also provided as a high-side input to an arithmetic block 254 having the function $u^v$ stored therein. The low-side input of the block 254 receives as an input the output of an arithmetic block 252 having a division input receiving an air specific heat ratio value, ASHR, stored in the memory location 250. ASHR is also supplied to an additive input of a summation node 246 having a subtractive input receiving the value 1 stored in the memory location 248. The output of the summation node 246 is provided as a multiplication input to the arithmetic block 252 such that the output of the arithmetic block 254 is $[(ASHR-1)/ASHR]^{APPR}$, which is supplied to an additive input of another summation node 256 having a subtractive input receiving the value 1 stored in the memory location 258. The output of the summation node 256 is provided as a multiplication input to an arithmetic block 260 having a division input receiving an air pump efficiency value, APEF, stored in the memory location 262. The output of the arithmetic block 260 is thus the quantity $[[(ASHR-1)/ASHR]^{APPR}-1]/APEF$. The output of the arithmetic block 260 is provided as an additive input to another summation node 264 having another additive input receiving the value 1 stored in the memory location 266. The output of the summation node 264 is provided as one input to a multiplication block 268 having another input receiving the value APIT+273 from the summation node 230. The output of the multiplication block 268 is provided to an additive input of another summation node 270 having a subtractive input receiving the value 273 stored in the memory location 272. The output of the summation node 273 is provided as a "true" input of another true/false block 274, and is the quantity $\{[[[(ASHR-1)/ASHR]^{APPR}-1]/APEF+1]*(APIT+273)\}-273$. The air pump inlet temperature, APIT, is provided as the "false" input of the true/false block 274, and the air pump enable value, APE, is the control input to the true/false block 274. Thus, if APE=1 such that the air pump 42 is activated and operational, the true/false block 274 produces the quantity $\{[[[(ASHR-1)/ASHR]^{APPR}-1]/APEF+1]*(APIT+273)\}-273$ as the air pump outlet temperature, APOT. If APE=0 such that the air pump is deactivated and therefore not operational, the true/false block 274 produces APIT, i.e., AT, as the air pump outlet temperature, APOT.

Figure 11:
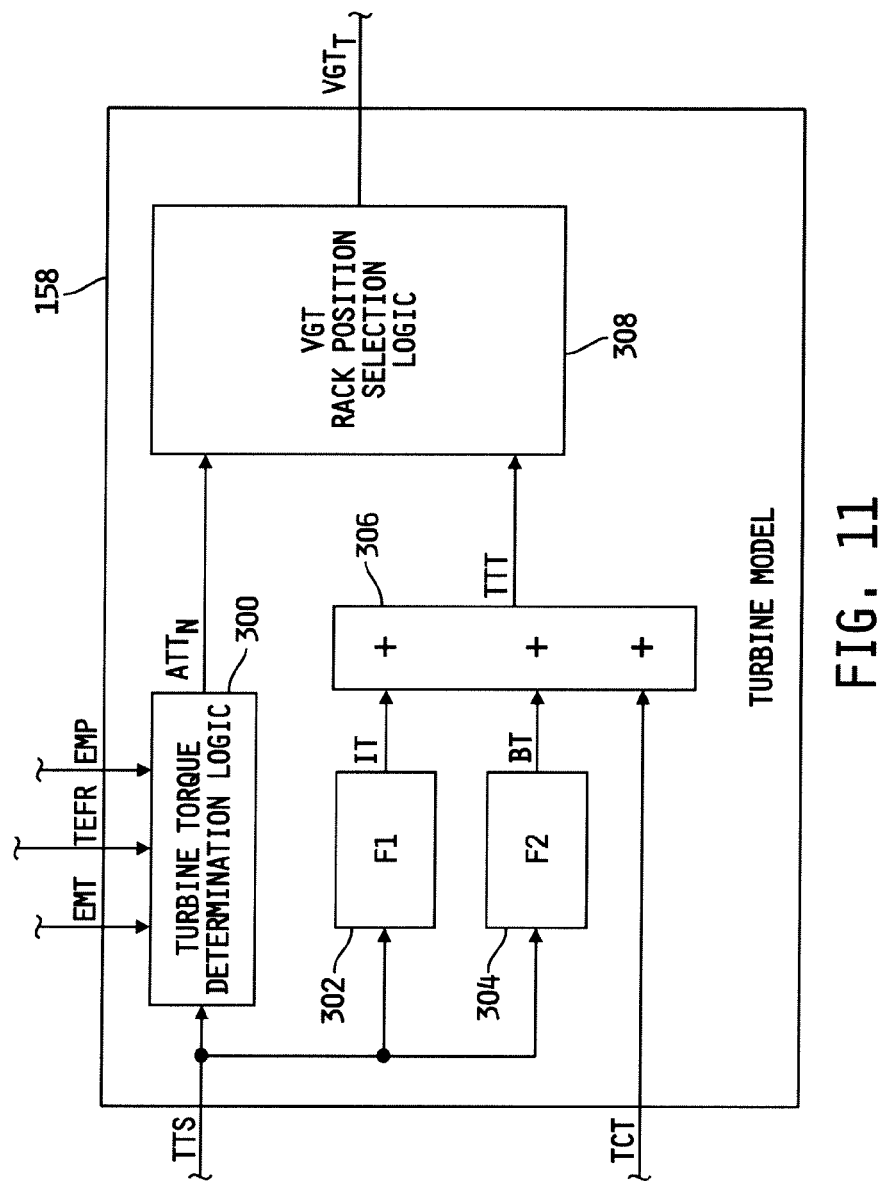
FIG. 11 is a block diagram of one illustrative embodiment of the turbine model illustrated in FIG. 4.

Referring now to FIG. 11, one illustrative embodiment of the turbine model 158 illustrated in FIG. 4 is shown. In the illustrated embodiment, the turbine model 158 includes a turbine torque determination logic block 300 receiving as inputs the target turbocharger speed value, US, produced by the compressor model 152, the target exhaust manifold temperature, EMT and the target exhaust manifold pressure, EMP, produced by the cylinder model 156, and a target exhaust flow rate value, TEFR. Illustratively, TEFR may be determined as a conventional function of the target exhaust manifold pressure, EMT, produced by the cylinder model 156, and/or as a function of the target charge flow rate, TCHFR, and the target EGR flow rate, TEGRFR, produced by the combustion parameter to air handling reference generation model 150. In any case, the turbine torque determination logic 300 is operable to process US, TEFR. EMT and EMP and produce a number, N, of available turbine torque values, $ATT_N$, wherein each of the N ATT values corresponds to an available turbine torque at a different one of N possible rack positions, i.e., $ATT_1$ corresponds to an available turbine torque at rack position 1, $ATT_2$ corresponds to a different available turbine torque at rack position 2, etc.

Figure 12:
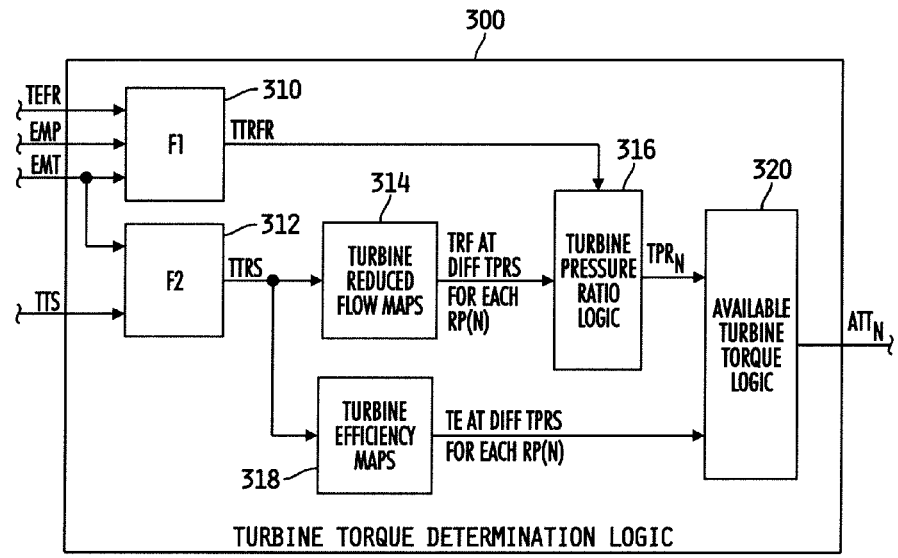
FIG. 12 is a block diagram of one illustrative embodiment of the turbine torque determination logic block illustrated in FIG. 11.

Referring now to FIG. 12, one illustrative embodiment of the turbine torque determination logic block 300 illustrated in FIG. 11 is shown. In the illustrated embodiment, the turbine torque determination logic block 300 includes a function block 310 receiving as inputs the target exhaust flow rate, TEFR, the target exhaust manifold pressure, EMP, and the exhaust manifold temperature, EMT, and producing as an output a target turbine reduced flow rate, TTRFR. Illustratively, the function, F1, stored in the function block 310 produces TTRFR in accordance with the equation TTRFR=TEFR*SORT(EMT)/EMP. The turbine torque determination logic block 300 further includes another function block 312 receiving as inputs the target exhaust manifold temperature, EMT, and the target turbocharger speed, TTS, and produces as an output a target turbine reduced speed, TTRS. Illustratively, the function, F2, stored in the function block 312 produces TTRS in accordance with the equation TTRS=TTS/SQRT(EMT). Alternatively, this disclosure contemplates other embodiments in which F1 and/or F2 includes more, fewer and/or different input parameters.

The target turbine reduced speed, TTRS, is provided as an input to another functional block 314 that illustratively has stored therein N conventional turbine reduced flow maps corresponding to the specific configuration of the turbocharger 18. Generally, each of the turbine reduced flow maps is designed to map, for a different rack position, TTRS to turbine reduce flow rate values, TRF, at a plurality of different turbine pressure ratios (TPRS). The functional block 314 is illustratively operable to process TTRS using the N turbine reduced flow maps to generate for each rack position a number of pairs of turbine reduced flow and turbine pressure ratio values.

Figure 13:
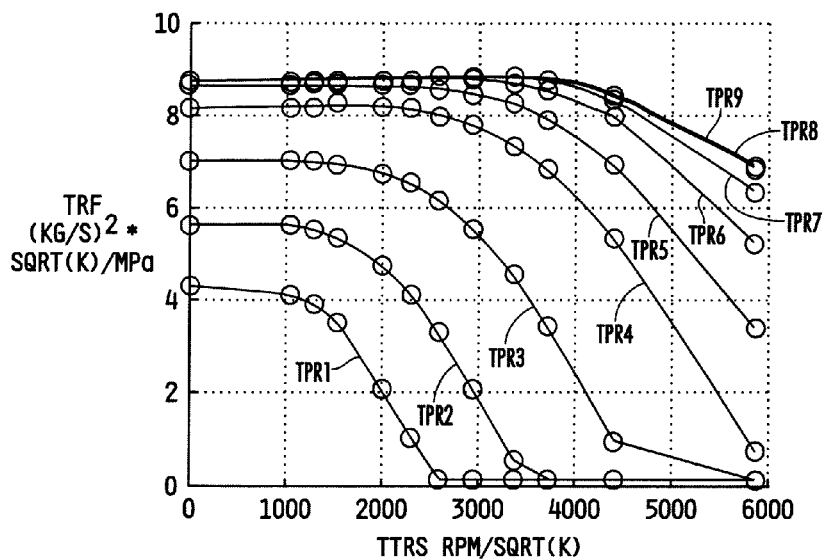
FIG. 13 is a plot of one illustrative example of one of the turbine reduced flow maps illustrated in FIG. 12.

Referring now to FIG. 13, an example of one such turbine reduced flow map is shown for one example rack position of the variable geometry turbine 24. In the illustrated embodiment, the turbine reduced flow map maps target turbine reduced speed values, TTRS, to turbine reduced flow values, TRF, at a plurality of different turbine pressure ratios, where the contours TPR1–TPR represent lines of different, constant turbine pressure ratios. With the turbine reduced flow map, any one value of TTRS thus produces a number, M, of different turbine reduced flow, TRF, and turbine pressure ratio, TPR, pairs $(TRF, TPR)_1, \ldots, (TRF, TPR)_M$, where M may be any positive integer.

Referring again to FIG. 12, the target turbine reduced flow rate, TTRFR, produced by the functional block 310 and the number of pairs of turbine reduced flow and turbine pressure ratio values, $(TRF, TPR)_{1-M}$, produced by the functional block 314 are provided as inputs to another functional block 316. The functional block 316 illustratively processes a function of at least two of the $(TRF, TPR)_{1-M}$ pair values and the TTRFR value to produce a number, N, of turbine pressure ratios; one for each of the N different rack positions. In one embodiment, for example, for each different rack position two of the (TRF, TPR)$_{1-M}$ pair values are selected with one pair having a TFR value that is less than TTRFR and the other pair having a TFR value that is greater than TTFR, and a conventional interpolation technique is used to determine a TPR value that corresponds to TCR for that rack position. In embodiments in which the function of the two (TRF, TPR)$_{1-M}$ pair values is linear, or can be acceptably approximated by a linear function, a conventional linear interpolation technique may be used to determine the N TPR values. Alternatively, in embodiments in which the function of the two (TRF, TPR)$_{1-M}$ pair values is non-linear, a conventional non-linear interpolation technique may be used to determine the N TPR values. Alternatively still, the functional block 316 may be configured to process the number of (TRF, TPR)$_{1-M}$ pair values to generate a continuous or piece-wise continuous profile of TPR values as a function of TRF, and such a profile can be processed as described above with respect to the functional block 172 to determine a TPR for each of the N different rack positions.

The target turbine reduced speed, TTRS, produced by the functional block 312 is also provided as an input to another functional block 318 that illustratively has stored therein a number, N, of conventional turbine efficiency maps corresponding to the specific configuration of the turbocharger 18. Generally, each of the N turbine efficiency maps is designed to map, for each of the N different turbine rack positions, values of TTRS to turbine efficiency (percentage) values at a plurality of different turbine pressure ratio values. The functional block 318 is illustratively operable to process TTRS using the N different turbine efficiency maps to generate for each of the N different rack positions a number of pairs of turbine efficiency and turbine pressure ratio values.

Figure 14:
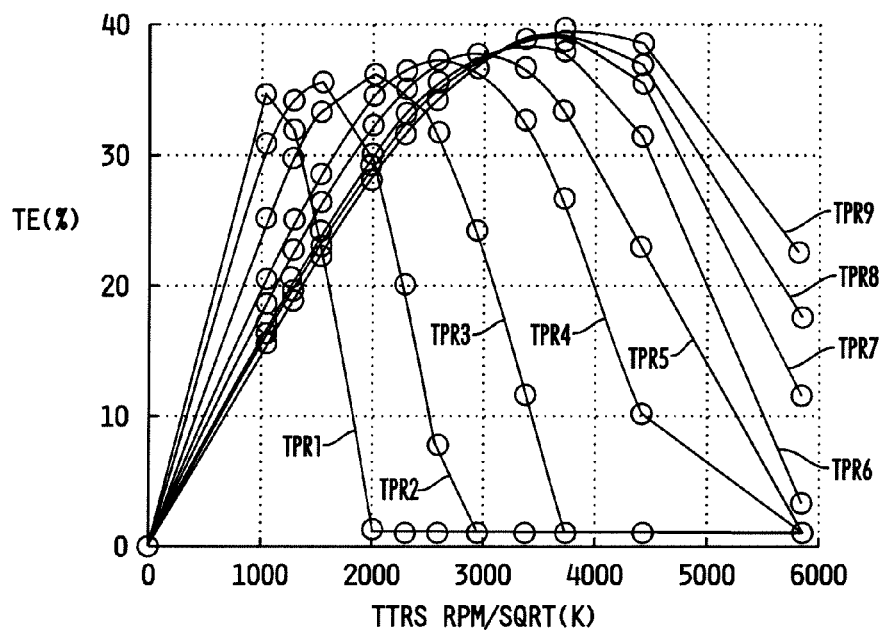
FIG. 14 is a plot of one illustrative example of one of the turbine efficiency maps illustrated in FIG. 12.

Referring now to FIG. 14, an example of one such turbine efficiency map is shown for one example rack position of the variable geometry turbine 24. In the illustrated embodiment, the turbine efficiency map maps target turbine reduced speed values, TTRS, to turbine efficiency values, TE, at a plurality of different turbine pressure ratios, where the contours TPR1–TPR9 represent lines of different, constant turbine pressure ratios. With the N turbine efficiency maps, any one value of TTRS thus produces a number, K, of different turbine efficiency, TE, and turbine pressure ratio, TPR, pairs (TE, TPR)$_1$, . . . , (TE, TPR)$_K$, for each of the N different rack positions where K may be any positive integer.

Referring again to FIG. 12, the N turbine pressure ratio values, TPR, produced by the functional block 316 and the number of pairs of turbine efficiency and turbine pressure ratio values, (TE, TPR)$_{1-K}$, produced by the functional block 318 for each of the N different rack positions are provided as inputs to another functional block 320. Similarly to the functional block 314, the functional block 320 processes a function of at least two of the (TE, TPR)$_{1-K}$ pair values and the TPR value for each of the N different rack positions to produce an available turbine torque estimate, ATT, for each of the N different rack positions. In one embodiment, for example, for each rack position two of the (TE, TPR)$_{1-K}$ pair values are selected with one pair having a TPR value that is less than the corresponding TPR value produced by the logic block 316 and the other pair having a TPR value that is greater than the TPR value produced by the logic block 316, and a conventional interpolation technique is used to determine a corresponding ATT value. In embodiments in which the function of the two (TE, TPR)$_{1-K}$ pair values is linear, or can be acceptably approximated by a linear function, a conventional linear interpolation technique may be used to determine the ATT values. Alternatively, in embodiments in which the function of the two (TE, TPR)$_{1-K}$ pair values is non-linear, a conventional non-linear interpolation technique may be used to determine the ATT values. Alternatively still, the functional block 320 may be configured to process the number of (TE, TPR)$_{1-K}$ pair values to generate a continuous or piece-wise continuous profile of available turbine torque values as a function of turbine efficiencies, and such a profile can be processed as described above with respect to the functional block 172 to determine ATT values for each of the N different turbine rack positions.

Referring again to FIG. 11, the turbine model 158 further includes a functional block 302 receiving the target turbocharger speed, US, as an input and producing as an output an inertia torque value, IT. Illustratively, IT corresponds to torque associated with the inertia of the rotating turbocharger shaft 30, and F1 illustratively determines IT as a function of TTS. In one illustrative embodiment, for example, F1 computes IT in accordance with the equation IT=I dTTS/dt, where I is the inertia associated with the rotation of the turbocharger shaft 30. Illustratively, I is a constant determined in a conventional manner as a function of the dimensions and structure of the shaft 30.

Figure 15:
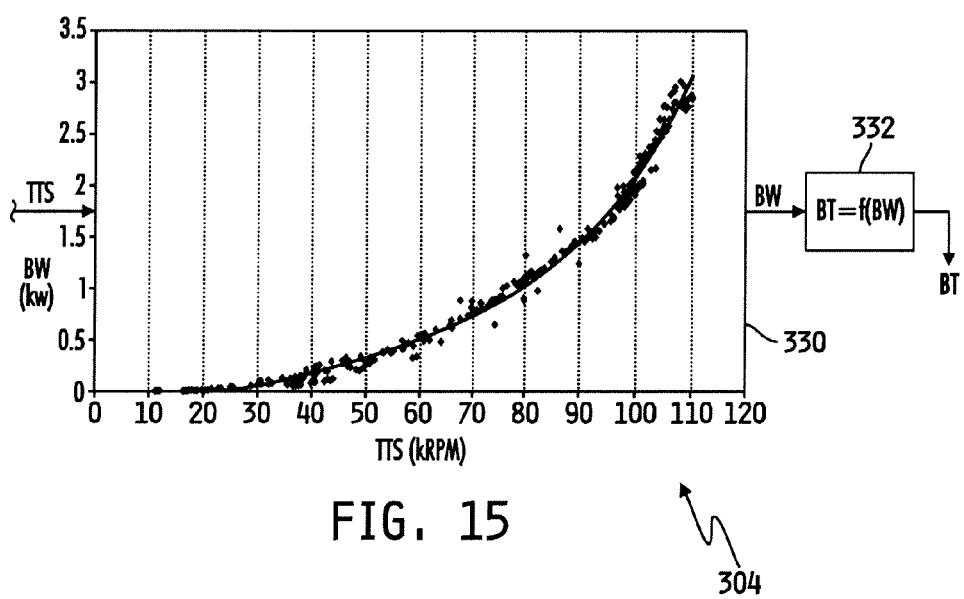
FIG. 15 is a block diagram of one illustrative embodiment and example of the function block F2 illustrated in FIG. 11.

The turbine model 158 further includes another functional block 304 receiving the target turbocharger speed, TTS, as an input and producing as an output a bearing torque value, BT. Illustratively, BT corresponds to torque associated with the bearing housing of the turbocharger 18, and F2 illustratively determines BT as a function of TTS. Referring to FIG. 15, one illustrative embodiment of the functional block 304 is shown. In the illustrated embodiment, the functional block 304 includes a turbocharger bearing work map 330 that maps the target turbine speed, TTS, to a bearing work value, BW. The bearing work value, BW, corresponding to the target turbine speed, US, is provided as an input to another functional block 332 that computes the bearing torque value, BT, as a function of the bearing work value, BW, provided by the map 330. In one illustrative embodiment, the functional relationship between BT and BW is given by the relationship BT=a+b*BW+c*BW$^2$+d*BW$^3$, where a, b, c and d are calibratible constants. It will be understood, however, that this disclosure contemplates other relationships defining BT as a function of BW and/or that define BT as a function of US.

Referring again to FIG. 11, the torque values IT and BT are provided, along with the target compressor torque, TCT, to separate additive inputs of an addition block 306 such that the output of the addition block represents a total target torque, TTT=CTT+IT+BT, which is required to drive the compressor with the target compressor torque. The total target torque, TTT, is provided as one input to a VGT rack position selection logic block 308 and the N available turbine torque values, ATT$_N$, are provided to another input of the block 308. The logic block 308 is generally operable to select in a conventional manner a turbine rack position that has sufficient available torque to satisfy TTT. The logic block 308 is then operable to control VGT$_T$ to select that turbine rack position.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A method of controlling an air handling system for an internal combustion engine including a turbocharger having a variable geometry turbine fluidly coupled to an exhaust manifold of the engine, a compressor having a compressor outlet fluidly coupled to an intake manifold of the engine, an electric air pump fluidly coupled to a fresh air inlet of the compressor, and a first fluid passageway fluidly coupled between the fresh air inlet of the compressor and ambient, a first air intake valve disposed in-line with the first fluid passageway, a second fluid passageway fluidly coupled between an air inlet of the electric air pump and the first fluid passageway between the first intake valve and ambient, a second air intake valve disposed in-line with the second fluid passageway, a third fluid passageway fluidly coupled between an air outlet of the electric air pump and the first fluid passageway between the first intake valve and the fresh air inlet of the compressor, and a third air intake valve disposed in-line with the third fluid passageway, the method of controlling the air handling system comprising:
  determining an air pump enable value as a function of target engine speed and total fuel target values,
  determining an air flow target as a function of a target fresh air flow value,
  activating operation of the electric air pump to supply supplemental air flow to the fresh air inlet of the compressor if the air pump enable value is greater than a threshold air pump enable value and the air flow target does not exceed a maximum flow value, and
  closing the first air intake valve, opening the second air intake valve, and opening third air intake valves when operation of the electric air pump is activated.

2. A method of controlling an air handling system for an internal combustion engine including a turbocharger having a variable geometry turbine fluidly coupled to an exhaust manifold of the engine, a compressor having a compressor outlet fluidly coupled to an intake manifold of the engine, and an electric air pump fluidly coupled to a fresh air inlet of the compressor, the method of controlling the air handling system comprising:
  determining an air pump enable value as a function of target engine speed and total fuel target values,
  determining an air flow target as a function of a target fresh air flow value,
  activating operation of the electric air pump to supply supplemental air flow to the fresh air inlet of the compressor if the air pump enable value is greater than a threshold air pump enable value and the air flow target does not exceed a maximum flow value, and
  disabling operation of the electric air pump from supplying supplemental air flow to the fresh air inlet of the compressor if at least one of the air pump enable value does not exceed the threshold air pump enable value and the air flow target exceeds the maximum flow value.

3. The method of controlling the air handling system of claim 2, wherein the air handling system further comprises a first fluid passageway fluidly coupled between the fresh air inlet of the compressor and ambient, a first air intake valve disposed in-line with the first fluid passageway, a second fluid passageway fluidly coupled between an air inlet of the electric air pump and the first fluid passageway between the first intake valve and ambient, a second air intake valve disposed in-line with the second fluid passageway, a third fluid passageway fluidly coupled between an air outlet of the electric air pump and the first fluid passageway between the first intake valve and the fresh air inlet of the compressor, and a third air intake valve disposed in-line with the third fluid passageway, and
  wherein the method further comprises opening the first air intake valve and closing the second and third air intake valves when operation of the electric air pump is disabled.

4. A method of controlling an air handling system for an internal combustion engine including a turbocharger having a variable geometry turbine fluidly coupled to an exhaust manifold of the engine, a compressor having a compressor outlet fluidly coupled to an intake manifold of the engine, and an electric air pump fluidly coupled to a fresh air inlet of the compressor, the method of controlling the air handling system comprising:
  determining an air pump enable value as a function of target engine speed and total fuel target values,
  determining an air flow target as a function of a target fresh air flow value,
  activating operation of the electric air pump to supply supplemental air flow to the fresh air inlet of the compressor if the air pump enable value is greater than a threshold air pump enable value and the air flow target does not exceed a maximum flow value,
  determining a target turbine speed and a target compressor torque as a function of a target compressor flow rate, a target compressor outlet pressure, a compressor inlet pressure and a compressor inlet temperature,
  determining a target rack setting of the variable geometry turbine as a function of the target turbine speed, the target compressor torque, a target exhaust manifold temperature and a target exhaust manifold pressure, and
  controlling a rack setting of the variable geometry turbine as a function of the target rack setting.

5. The method of controlling the air handling system of claim 4, further comprising:
  determining an air pump outlet pressure corresponding to a pressure of air supplied by the air pump, and
  determining an air pump outlet temperature corresponding to a temperature of air supplied by the air pump, and
  wherein determining the target turbine speed and the target compressor torque comprises determining the target turbine speed and the target compressor torque using the air pump outlet temperature as the compressor inlet temperature and using the air pump outlet pressure as the compressor inlet pressure when the operation of the air pump is enabled and the air pump is operating.

6. The method of controlling the air handling system of claim 5, further comprising:
  determining ambient temperature, and
  determining ambient pressure,
  wherein determining the air pump outlet pressure comprises determining the air pump outlet pressure as a function of the ambient temperature, the ambient pressure and the air flow target, and
  wherein determining the air pump outlet temperature comprises determining the air pump outlet temperature as a function of the ambient temperature, the ambient pressure and the air flow target.

7. The method of controlling the air handling system of claim 5, further comprising:
  determining ambient temperature, and
  determining ambient pressure,
  wherein determining the target turbine speed and the target compressor torque comprises determining the target turbine speed and the target compressor torque using the ambient pressure as the compressor inlet pressure and the ambient temperature as the compressor inlet temperature if operation of the electric air pump is otherwise disabled and non-operational.

8. A method of controlling an air handling system for an internal combustion engine including a turbocharger having a variable geometry turbine fluidly coupled to an exhaust manifold of the engine, a compressor having a compressor outlet fluidly coupled to an intake manifold of the engine, and an electric air pump fluidly coupled to a fresh air inlet of the compressor, the method of controlling the air handling system comprising:

determining an air pump enable value as a function of target engine speed and total fuel target values, determining an air flow target as a function of a target fresh air flow value, activating operation of the electric air pump to supply supplemental air flow to the fresh air inlet of the compressor if the air pump enable value is greater than a threshold air pump enable value and the air flow target does not exceed a maximum flow value, conducting an engine and fueling operation check, and wherein activating operation of the electric air pump comprises activating operation of the electric air pump if the air pump enable value is greater than a threshold air pump enable value, the air flow target does not exceed a maximum flow value and the engine and fueling operation check passes.

9. The method of controlling the air handling system of claim 8, wherein the air handling system further includes an exhaust gas recirculation (EGR) fluid passageway fluidly coupled between the exhaust manifold and the intake manifold, and wherein the method further comprises determining the target exhaust manifold temperature and the target exhaust manifold pressure based on target charge parameters, target engine fueling parameters and a target flow rate of exhaust gas in the EGR fluid passageway.

10. An air handling system for an internal combustion engine, the air handling system comprising:

a turbocharger having a variable geometry turbine fluidly coupled to an exhaust manifold of the engine and a compressor having a compressor outlet fluidly coupled to an intake manifold of the engine, the variable geometry turbine rotatably connected to the compressor via a rotatable shaft such that the variable geometry turbine rotatably drives the compressor via the rotatable shaft in response to exhaust gas passing through the variable geometry turbine, an electric air pump configured to selectively supply supplemental air flow to a fresh air inlet of the compressor when enabled for operation, a control circuit including a memory having instructions stored therein that are executable by the control circuit to determine an air pump enable value as a function of at least one of a target engine speed and a total fueling target, to determine an air flow target as a function of a target fresh air flow value, and to activate the electric air pump to supply supplemental air flow to the fresh air inlet of the compressor if the air pump enable value is greater than a threshold air pump enable value and the air flow target does not exceed a maximum flow value, a first fluid passageway fluidly coupled between the fresh air inlet of the compressor and ambient, a first air intake valve disposed in-line with the first fluid passageway, a second fluid passageway fluidly coupled between an air inlet of the electric air pump and the first fluid passageway between the first intake valve and ambient, a second air intake valve disposed in-line with the second fluid passageway, a third fluid passageway fluidly coupled between an air outlet of the electric air pump and the first fluid passageway between the first intake valve and the fresh air inlet of the compressor, and a third air intake valve disposed in-line with the third fluid passageway, wherein the instructions stored in the memory further include instructions executable by the processor to close the first air intake valve and open the second and third air intake valves when operation of the electric air pump is activated.

11. An air handling system for an internal combustion engine, the air handling system comprising:

a turbocharger having a variable geometry turbine fluidly coupled to an exhaust manifold of the engine and a compressor having a compressor outlet fluidly coupled to an intake manifold of the engine, the variable geometry turbine rotatably connected to the compressor via a rotatable shaft such that the variable geometry turbine rotatably drives the compressor via the rotatable shaft in response to exhaust gas passing through the variable geometry turbine, an electric air pump configured to selectively supply supplemental air flow to a fresh air inlet of the compressor when enabled for operation, and a control circuit including a memory having instructions stored therein that are executable by the control circuit to determine an air pump enable value as a function of at least one of a target engine speed and a total fueling target, to determine an air flow target as a function of a target fresh air flow value, and to activate the electric air pump to supply supplemental air flow to the fresh air inlet of the compressor if the air pump enable value is greater than a threshold air pump enable value and the air flow target does not exceed a maximum flow value, wherein the instructions stored in the memory further include instructions that are executable by the control circuit to disable operation of the electric air pump from supplying supplemental air flow to the fresh air inlet of the compressor if at least one of the air pump enable value does not exceed the threshold air pump enable value and the air flow target exceeds the maximum flow value.

12. The air handling system of claim 11 further comprising:

a first fluid passageway fluidly coupled between the fresh air inlet of the compressor and ambient, a first air intake valve disposed in-line with the first fluid passageway, a second fluid passageway fluidly coupled between an air inlet of the electric air pump and the first fluid passageway between the first intake valve and ambient, a second air intake valve disposed in-line with the second fluid passageway, a third fluid passageway fluidly coupled between an air outlet of the electric air pump and the first fluid passageway between the first intake valve and the fresh air inlet of the compressor, and a third air intake valve disposed in-line with the third fluid passageway, wherein the instructions stored in the memory further include instructions executable by the processor to open the first air intake valve and close the second and third air intake valves when operation of the electric air pump is disabled to direct fresh air from ambient into the first fluid passageway, through the first air intake valve and to the fresh air inlet of the compressor.

13. An air handling system for an internal combustion engine, the air handling system comprising:

a turbocharger having a variable geometry turbine fluidly coupled to an exhaust manifold of the engine and a compressor having a compressor outlet fluidly coupled to an intake manifold of the engine, the variable geometry turbine rotatably connected to the compressor via a rotatable shaft such that the variable geometry turbine rotatably drives the compressor via the rotatable shaft in response to exhaust gas passing through the variable geometry turbine, an electric air pump configured to selectively supply supplemental air flow to a fresh air inlet of the compressor when enabled for operation, and a control circuit including a memory having instructions stored therein that are executable by the control circuit to determine an air pump enable value as a function of at least one of a target engine speed and a total fueling target, to determine an air flow target as a function of a target fresh air flow value, and to activate the electric air pump to supply supplemental air flow to the fresh air inlet of the compressor if the air pump enable value is greater than a threshold air pump enable value and the air flow target does not exceed a maximum flow value, wherein the instructions stored in the memory further include instructions that are executable by the control circuit to determine a target turbine speed and a target compressor torque as a function of a target compressor flow rate, a target compressor outlet pressure, a compressor inlet pressure and a compressor inlet temperature, to determine a target rack setting of the variable geometry turbine as a function of the target turbine speed, the target compressor torque, a target exhaust manifold temperature and a target exhaust manifold pressure, and to control a rack setting of the variable geometry turbine as a function of the target rack setting.

14. The air handling system of claim 13 wherein the instructions stored in the memory further include instructions that are executable by the control circuit to determine when operation of the air pump is activated an air pump outlet pressure corresponding to a pressure of air supplied by the air pump and an air pump outlet temperature corresponding to a temperature of air supplied by the air pump, and to determine the target turbine speed and the target compressor torque using the air pump outlet temperature as the compressor inlet temperature and using the air pump outlet pressure as the compressor inlet pressure when the operation of the air pump is activated and the air pump is operating.

15. The air handling system of claim 14 further comprising:
means for determining ambient temperature, and
means for determining ambient pressure,
wherein the instructions stored in the memory further include instructions that are executable by the control circuit to determine the air pump outlet pressure and the air pump outlet temperature each as a function of ambient pressure, the air flow target, and ambient temperature.

16. The air handling system of claim 14 further comprising:
means for determining ambient temperature, and
means for determining ambient pressure, wherein the instructions stored in the memory further include instructions that are executable by the control circuit to determine the target turbine speed and the target compressor torque using the ambient pressure as the compressor inlet pressure and the ambient temperature as the compressor inlet temperature if operation of the electric air pump is otherwise disabled and non-operational.

17. An air handling system for an internal combustion engine, the air handling system comprising:
a turbocharger having a variable geometry turbine fluidly coupled to an exhaust manifold of the engine and a compressor having a compressor outlet fluidly coupled to an intake manifold of the engine, the variable geometry turbine rotatably connected to the compressor via a rotatable shaft such that the variable geometry turbine rotatably drives the compressor via the rotatable shaft in response to exhaust gas passing through the variable geometry turbine, an electric air pump configured to selectively supply supplemental air flow to a fresh air inlet of the compressor when enabled for operation, a control circuit including a memory having instructions stored therein that are executable by the control circuit to determine an air pump enable value as a function of at least one of a target engine speed and a total fueling target, to determine an air flow target as a function of a target fresh air flow value, and to activate the electric air pump to supply supplemental air flow to the fresh air inlet of the compressor if the air pump enable value is greater than a threshold air pump enable value and the air flow target does not exceed a maximum flow value, wherein the instructions stored in the memory further include instructions that are executable by the control circuit to conduct an engine and fueling operation check and activate the electric air pump if the air pump enable value is greater than a threshold air pump enable value, the air flow target does not exceed a maximum flow value and if the engine and fueling check passes.

18. An air handling system for an internal combustion engine, the air handling system comprising:
a turbocharger having a variable geometry turbine fluidly coupled to an exhaust manifold of the engine and a compressor having a compressor outlet fluidly coupled to an intake manifold of the engine, the variable geometry turbine rotatably connected to the compressor via a rotatable shaft such that the variable geometry turbine rotatably drives the compressor via the rotatable shaft in response to exhaust gas passing through the variable geometry turbine, an electric air pump configured to selectively supply supplemental air flow to a fresh air inlet of the compressor when enabled for operation, a control circuit including a memory having instructions stored therein that are executable by the control circuit to determine an air pump enable value as a function of at least one of a target engine speed and a total fueling target, to determine an air flow target as a function of a target fresh air flow value, and to activate the electric air pump to supply supplemental air flow to the fresh air inlet of the compressor if the air pump enable value is greater than a threshold air pump enable value and the air flow target does not exceed a maximum flow value, and an exhaust gas recirculation (EGR) fluid passageway fluidly coupled between the exhaust manifold and the intake manifold, wherein the instructions stored in the memory further include instructions that are executable by the control circuit to determine the target exhaust manifold temperature and the target exhaust manifold pressure based on target charge parameters, target engine fueling parameters and a target flow rate of exhaust gas in the EGR fluid passageway.

* * * * *